United States Patent
Ichikawa et al.

(10) Patent No.: US 11,799,401 B2
(45) Date of Patent: Oct. 24, 2023

(54) DRIVE SYSTEM

(71) Applicant: TOSHIBA MITSUBISHI-ELECTRIC INDUSTRIAL SYSTEMS CORPORATION, Chuo-ku (JP)

(72) Inventors: Soichiro Ichikawa, Tokyo (JP); Masashi Nakamura, Tokyo (JP); Takumi Ito, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/759,092

(22) PCT Filed: Jan. 22, 2020

(86) PCT No.: PCT/JP2020/002113
§ 371 (c)(1),
(2) Date: Jul. 19, 2022

(87) PCT Pub. No.: WO2021/149187
PCT Pub. Date: Jul. 29, 2021

(65) Prior Publication Data
US 2023/0039054 A1    Feb. 9, 2023

(51) Int. Cl.
*H02P 5/56* (2016.01)
*H04L 7/04* (2006.01)

(52) U.S. Cl.
CPC . *H02P 5/56* (2016.02); *H04L 7/04* (2013.01)

(58) Field of Classification Search
CPC ........................................................... H02P 5/56
See application file for complete search history.

(56) References Cited

U.S. PATENT DOCUMENTS 5,990,638 A * 11/1999 Aoyama ............ G05B 19/4141
700/169
2005/0237012 A1* 10/2005 Numauchi ............ G05B 19/19
318/85

FOREIGN PATENT DOCUMENTS

| JP | 2007-213474 A | 8/2007 |
| JP | 2015-111967 A | 6/2015 |
| WO | WO 2009/128198 A1 | 10/2009 |

OTHER PUBLICATIONS

Indian Office Action dated Dec. 9, 2022 in Indian Application No. 202217040386, 6 pages.
International Search Report dated Apr. 7, 2020, in PCT/JP2020/002113, filed on Jan. 22, 2020, therein, 2 pages.

* cited by examiner

*Primary Examiner* — Kawing Chan
(74) *Attorney, Agent, or Firm* — Oblon, McClelland, Maier & Neustadt, L.L.P.

(57) ABSTRACT

A master device of a drive system transmits identification information of each first period and a first transmission synchronization signal for each first period of a reference period. A first controller adjusts a phase of each first control period such that the first control period is synchronized with a timing associated with a specific first synchronization signal. A second controller adjusts a phase of each second control period such that the second control period is synchronized with a timing associated with a specific second synchronization signal.

16 Claims, 14 Drawing Sheets

FIG. 11

| IDENTIFICATION INFORMATION | TIME DIFFERENCE DATA | TIME | REMARK |
|---|---|---|---|
| - | 0 | t0 | (STARTING POINT) |
| D31 | Δt1 | t1 | FOR DRIVE DEVICE 31 |
| D32 | Δt2 | t2 | FOR DRIVE DEVICE 32 |
| ... | ... | ... | ... |
| ... | ... | ... | ... |

FIG. 12

| IDENTIFICATION INFORMATION | DELAY TIME | TRANSMISSION TIME | DESIGNATED TIME |
|---|---|---|---|
| D31 | TD1 | tTX1 | tST1 |
| D32 | TD2 | tTX2 | tST2 |
| ... | ... | ... | ... |
| ... | ... | ... | ... |

DRIVE SYSTEM

TECHNICAL FIELD

Embodiments of the invention relate to a drive system.

BACKGROUND ART

A drive system drives electric motors which are provided in a plurality of drive devices. In an application for conveying an object at a desired speed using power of the electric motors, an alignment property of the electric motors needs to be good. On the other hand, there are drive systems in which it is difficult to further enhance the alignment property of a plurality of electric motors.

CITATION LIST

Patent Literature

[Patent Literature 1]
Japanese Unexamined Patent Application, First Publication No. 2007-213474

SUMMARY OF INVENTION

Technical Problem

An objective of the invention is to provide a drive system that can further enhance an alignment property of a plurality of electric motors.

Solution to Problem

A drive system according to an embodiment includes a first drive device, a second drive device, and a master device. The first drive device includes a first power converter that supplies first electric power to a winding of a first electric motor and a first controller that controls the first power converter. The second drive device includes a second power converter that supplies second electric power to a winding of a second electric motor and a second controller that controls the second power converter. The master device controls the first controller and the second controller using a first period and a reference period including a plurality of the first periods. The master device transmits identification information of each first period and a first transmission synchronization signal for each first period of the reference period or transmits identification information of each first period, a first transmission synchronization signal, and a second transmission synchronization signal for each first period of the reference period. The first controller adjusts a phase of each first control period such that the first control period is synchronized with a timing associated with a specific first synchronization signal out of a plurality of first synchronization signals which are acquired by reception of the first transmission synchronization signal a plurality of times using the identification information and controls the first power converter using the first control period. The second controller adjusts a phase of each second control period such that the second control period is synchronized with a timing associated with a specific second synchronization signal out of a plurality of second synchronization signals which are acquired by one of reception of the first transmission synchronization signal a plurality of times and reception of the second transmission synchronization signal a plurality of times using the identification information and controls the second power converter using the second control period.

BRIEF DESCRIPTION OF DRAWINGS

FIG. 11 is a diagram illustrating a transmission time data table according to the second embodiment.
FIG. 12 is a diagram illustrating a correction calculating data table according to the second embodiment.

DESCRIPTION OF EMBODIMENTS

Hereinafter, a drive system according to an embodiment will be described with reference to the accompanying drawings.

In the following description, a drive system that performs alignment control is simply referred to as a drive system. Elements having the same or similar functions will be referred to by the same reference signs. Repeated description of such elements may be omitted. Electrical connection may be simply referred to as "connection."

First Embodiment

Figure 1:
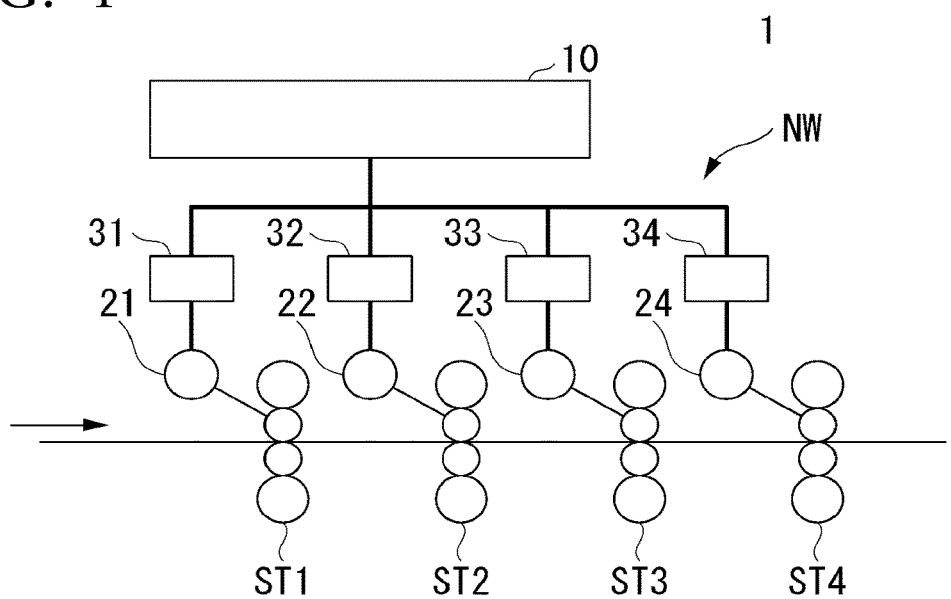
FIG. 1 is a diagram illustrating a configuration of a drive system according to a first embodiment.

FIG. 1 is a diagram illustrating a configuration of a drive system 1 according to a first embodiment.
The drive system 1 includes, for example, a master device 10 and first to fourth drive devices 31 to 34. First to fourth electric motors 21 to 24 are an example of electric motors which are to be controlled by the drive system 1.

In FIG. 1, an example of manufacturing equipment associated with the drive system 1 is also illustrated.

The manufacturing equipment illustrated in FIG. 1 includes, for example, first to fourth rolling stands ST1 to ST4 that are used to convey an object. The first electric motor 21 is provided in the first rolling stand ST1, the second electric motor 22 is provided in the second rolling stand ST2, the third electric motor 23 is provided in the third rolling stand ST3, and the fourth electric motor 24 is provided in the fourth rolling stand ST4. The first to fourth rolling stands ST1 to ST4 are driven with power of the first to fourth electric motors 21 to 24, respectively.

The first electric motor 21 is driven by the first drive device 31. The second electric motor 22 is driven by the second drive device 32. The third electric motor 23 is driven by the third drive device 33. The fourth electric motor 24 is driven by the fourth drive device 34. When not distinguished from each other, the first to fourth electric motors 21 to 24 are simply referred to as electric motors 20. When not distinguished from each other, the first to fourth drive devices 31 to 34 are simply referred to as drive devices 30. By simultaneously activating the electric motors 20 using the drive devices 30, the first to fourth rolling stands ST1 to ST4 are driven with power which is output from the electric motors 20. Accordingly, an object which is relatively long in a first direction is at least conveyed in an extending direction of the object (the first direction). Examples in which the drive devices 30 simultaneously activate the electric motors 20 include a case in which the electric motors 20 are activated by controlling the drive devices 30 in parallel and a case in which the electric motors 20 are activated by cooperation between the drive devices 30. The manufacturing equipment may be applied to, for example, a steel sheet (object) rolling process. Alternatively, the drive system 1 is not limited thereto but may be applied to manufacturing processes of paper or the like.

The master device 10 (a higher controller) adjusts a conveyance amount and a conveying speed of an object for each electric motor 20 by transmitting a command value to the drive devices 30 via a network NW and controlling the drive devices 30 using the command value. The master device 10 keeps a conveying state of an object good by adjusting (aligning) rotation speeds of the electric motors 20 to (with) the drive devices 30. The network NW is, for example, a wired local area network (LAN). In this embodiment, the network NW connects the master device 10 and the drive devices 30 in a bus manner. The type of the network NW is not limited thereto and another type with a different connection may be appropriately selected. The master device 10 and the drive devices 30 communicate with each other via the network NW using various types of information as packets.

Figure 2:
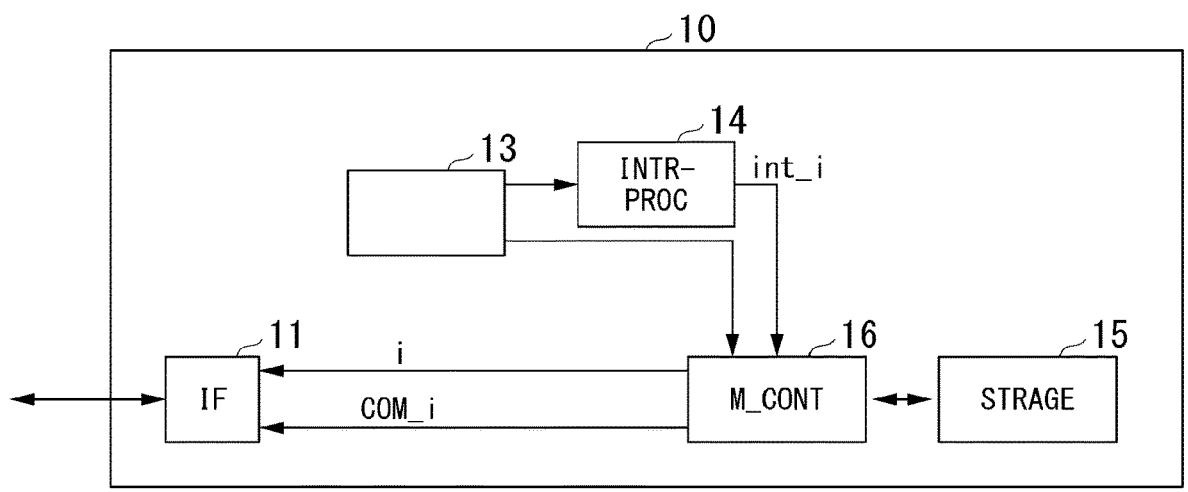
FIG. 2 is a diagram illustrating a configuration of a master device according to the first embodiment.

A more specific example of the master device 10 will be described below with reference to FIG. 2. FIG. 2 is a diagram illustrating a configuration of the master device 10 according to the first embodiment.

The master device 10 includes, for example, an interface unit 11 (IF In FIG. 2), a counter 13, an interruption signal generating unit 14 (INTR-PROC in FIG. 2), a storage unit 15 (STRAGE in FIG. 2), and a controller body 16 (M_CONT in FIG. 2).

The interface unit 11 receives various types of information which are provided from the master device 10 from the controller body 16 and transmits the received information to the drive devices 30 by communication with the drive device 30 via the network NW.

The counter 13 counts the number of waves of a signal with a fixed period which is supplied from an oscillator which is not illustrated in FIG. 2 and supplies a clock which the controller body 16 uses for discrete time control to the controller body 16. The counter 13 generates M clock signals with a first period by dividing a frequency of the clock into a predetermined number of clocks, and supplies the generated M clock signals with the first period to the interruption signal generating unit 14. Accordingly, an interruption period of the interruption signal generating unit 14 is performed.

The interruption signal generating unit 14 generates an interruption signal associated with the M clock signals which are supplied from the counter 13 and supplies the generated M clock signals to the controller body 16. A standard length is defined by design, and the actual first period is allowed to vary in a range which is permitted by design. The first period including the variation is referred to as a fixed period.

The storage unit 15 is realized by a read only memory (ROM), a random access memory (RAM), a hard disk drive (HDD), a flash memory, and the like. Storage areas for storing various types of setting information for causing the controller body 16 to function, basic programs such as an OS, and application programs are provided in the storage unit 15.

Along with the interface unit 11 and the storage unit 15, the controller body 16 is connected to a bus which is not illustrated in FIG. 2.

The controller body 16 includes a first processor that executes a software program. The first processor may also be referred to as a central processing unit (CPU) or a field-programmable gate array (FPGA). The software program which is executed by the first processor of the controller body 16 may be stored in the storage unit 15 in advance or may be downloaded from an external device or a portable storage medium which is not illustrated in FIG. 2 or via the network NW The controller body 16 realizes all functions of the controller body 16 which will be described below and some functions of the interruption signal generating unit 14 by executing a software program.

The controller body 16 generates a command value COM_i for controlling each drive device 30 and supplies the command value COM_i to the corresponding drive device 30. "i" is an integer and corresponds to identification information i which is correlated with the first period. For example, when an interruption signal supplied from the interruption signal generating unit 14 is detected, the controller body 16 generates a command value COM_i for each drive device 30 for each first period and supplies the command value COM_i for each drive device 30 to the corresponding device 30 in a prescribed order. For example, the controller body 16 supplies the command values COM_i for all the drive devices 30 in the corresponding first period.

The controller body 16 uses a reference period which is a period of multiple times the first period to synchronize the control periods of the drive device 30 sides. The controller body 16 correlates the identification information i for uniquely identifying each first period in the reference period with the corresponding first period. For example, the controller body 16 sets the identification information i on the starting point side of the reference period to 0 and sequentially monotonically increases the value of the identification information i correlated with the subsequent first period. The controller body 16 adds the identification information i to information (packets) which is sent to the drive devices 30 and transmits the resultant information.

The master device 10 generates a synchronization signal for aligning the drive devices 30 (for example, referred to as a first transmission synchronization signal) for each first period. Thereafter, the master device 10 supplies the packetized first transmission synchronization signal to the first to fourth drive devices 31 to 34 for each first period.

The controller body 16 adds the value of the identification information i correlated with each first period to the first transmission synchronization signal and transmits the resultant signal. The controller body 16 transmits the common first transmission synchronization signal to the drive devices 30. The controller body 16 may separately transmit the command value COM_i and the first transmission synchronization signal for each drive device 30 or may transmit the command value COM_i and the first transmission synchronization signal together.

Figure 3A:
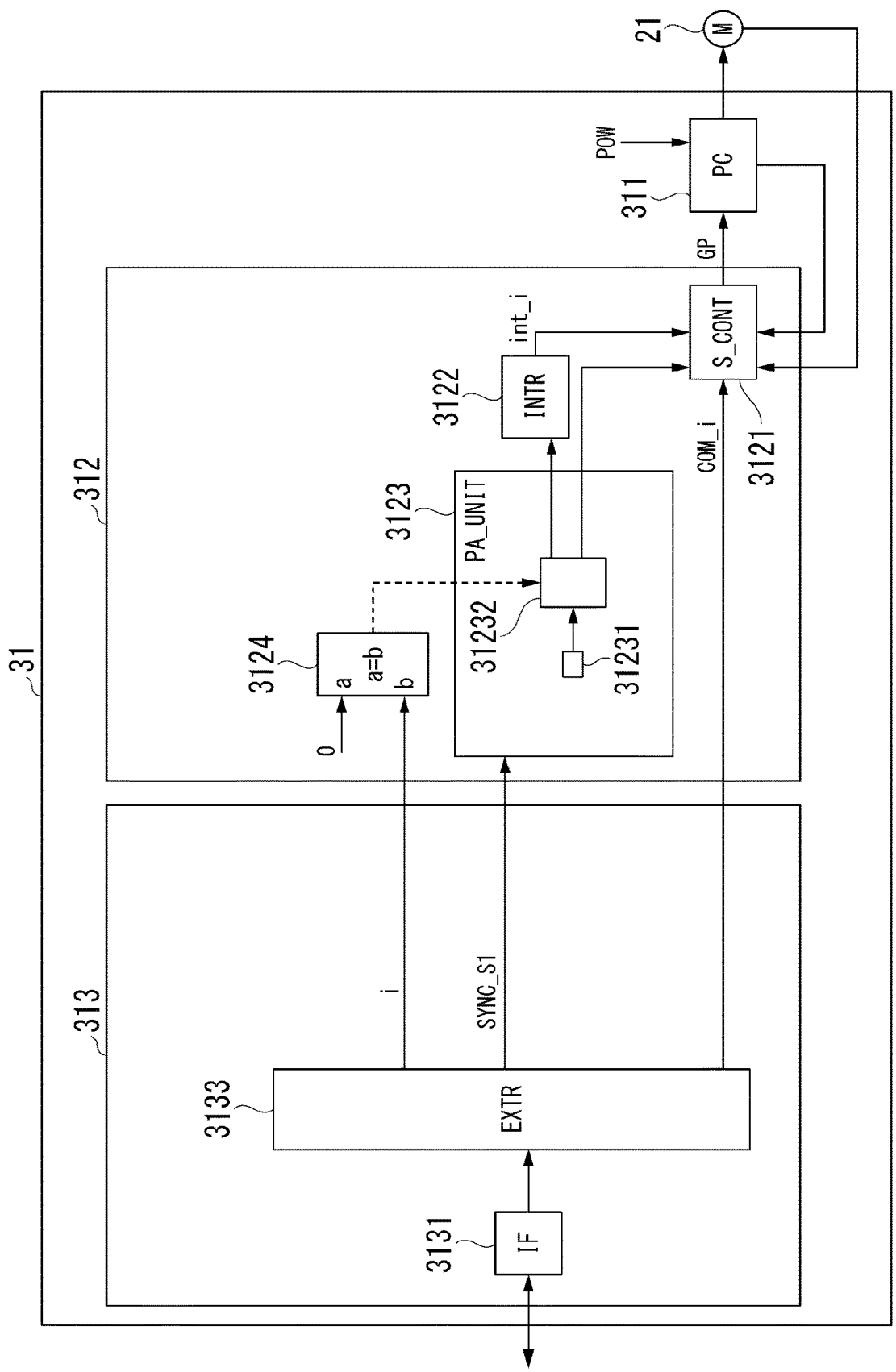
FIG. 3A is a diagram illustrating a configuration of a first drive device according to the first embodiment.

A more specific example of each drive device 30 will be described below with reference to FIGS. 3A and 3B. FIG. 3A is a diagram illustrating the configuration of the first drive device 31 according to the first embodiment.

The first drive device 31 includes, for example, a first power converter 311, a first controller 312, and a first communication processing unit 313. The first power converter 311 supplies first electric power for conveying an object to the winding (not illustrated) of the first electric motor 21.

In order to control the electric motor 20 which is an alternating-current electric motor using direct-current electric power POW, the first power converter 311 serves as a so-called inverter and converts the direct-current electric power POW into alternating-current electric power. This is merely an example and the invention is not limited thereto. For example, in order to control the electric motor 20 which is a direct-current electric motor using alternating-current electric power POW, the first power converter 311 serves as a converter and converts the alternating-current electric power POW into direct-current electric power. Since specifications of the first power converter 311 and the second power converter 321 are determined depending on specifications of the electric motors 20 and specifications of a power supply, a power converter of a type other than that mentioned above may be employed. In the following description, it is assumed that the electric motors 20 are alternating-current electric motors.

The first power converter 311 (PC in FIG. 3A) includes, for example, a plurality of semiconductor switches which are not illustrated in FIG. 3A and drive circuits thereof, where the plurality of semiconductor switches are formed in a full-bridge type or a half-bridge type. The circuit format of the first power converter 311 is not limited thereto and may be appropriately modified. The type of the plurality of semiconductor switches may be, for example, one of an insulated gate bipolar transistor (IGBT) and a field-effect transistor (FET), but is not limited to that type and another type of semiconductor switches may be employed or diodes may be appropriately combined.

The first controller 312 controls the first power converter 311.

The first controller 312 includes, for example, a first controller body 3121 (S_CONT in FIG. 3A), a first interruption signal generating unit 3122 (INTR in FIG. 3A), a phase adjusting unit 3123 (PA_UNIT in FIG. 3A), and a comparator 3124.

The first controller body 3121 generates a first gate signal GP for driving the first electric motor 21 on the basis of the command value COM_i which is supplied from the master device 10, and supplies the generated first gate signal GP to the first power converter 311. For example, the first controller body 3121 may generate the first gate signal GP by discrete time control using information of a position of a shaft of the first electric motor 21 and information of an output state of the first power converter 311 for a feedback value of feedback control. When an interruption signal which is supplied from the first interruption signal generating unit 3122 which will be described later is detected, the first controller body 3121 starts a process of controlling driving of the first electric motor 21 and performs the started process in one or more control periods of the discrete time control. For example, the first controller body 3121 can perform a process of controlling the first power converter 311 (a first process) by discrete time control which is synchronized with a first clock signal which will be described later using the first clock signal.

The first interruption signal generating unit 3122 generates an interruption signal at intervals which are adjusted to a standard length and supplies the generated interruption signal to the first controller body 3121. The period which is adjusted to the standard length is referred to as a first control period. The standard length is defined by design and the actual first control period is allowed to vary in a range which is permitted by design.

The comparator 3124 outputs a result of identification of a first period of the master device 10 using the identification information i as a logic value. The comparator 3124 outputs logic 1 when the first period of the master device 10 is determined to be a desired period which is determined by a user on the basis of the identification information i, that is, when the identification information i is the desired value, and outputs logic 0 when the first period of the master device 10 is not the desired period.

The phase adjusting unit 3123 supplies a first clock which the first controller body 3121 uses for the discrete time control to the first controller body 3121, and a second clock which serves as a basis of the first control period to the first interruption signal generating unit 3122. The phase adjusting unit 3123 adjusts the second clock to have the standard length, for example, on the basis of timing information of the first transmission synchronization signal which is supplied from the master device 10 and the result of comparison from the comparator 3124. Details of the phase adjusting unit 3123 including generation of the first clock and the second clock will be described later.

The first communication processing unit 313 communicates with the master device 10 via the network NW and supplies various types of information acquired from the master device 10 to the first controller 312.

For example, the first communication processing unit 313 includes an interface unit 3131 (IF in FIG. 3A) and an extraction processing unit 3133 (EXTR in FIG. 3A).

The interface unit 3131 is connected to the network NW and acquires various types of information which are transmitted by the master device 10 by communicating with the master device 10 via the network NW. Various types of information which are transmitted by the master device 10 include information on the command value COM_i which is commanded to the first drive device 31 by the master device 10 and the identification information i on the control period of the master device 10.

The extraction processing unit 3133 acquires various types of information which are transmitted by the master device 10 from the interface unit 3131, extracts the acquired information, and supplies the extracted information to destinations thereof.

The extraction processing unit 3133 supplies the identification information i added to a packet of a first transmission synchronization signal transmitted by the master device 10 (the identification information i indicating the control period in which the corresponding packet has been transmitted) and a first synchronization signal (SYNC_S1 in FIG. 3A) indicating a timing at which the packet has been received to the phase adjusting unit 3123.

For example, an arbitrary integer, for example, 0, is set for a first input a of the comparator 3124 and the identification information i for identifying the control period of the master device 10 is supplied to a second input b from the first communication processing unit 313. In this case, when the identification information i is 0, the comparator 3124 detects that the control period of the master device 10 is 0 and outputs logic 1.

As described above, the first controller 312 can obtain both the first synchronization signal and the identification information in which are output from the extraction processing unit 3133.

The second drive device 32 illustrated in FIG. 3B will be described below.

Figure 3B:
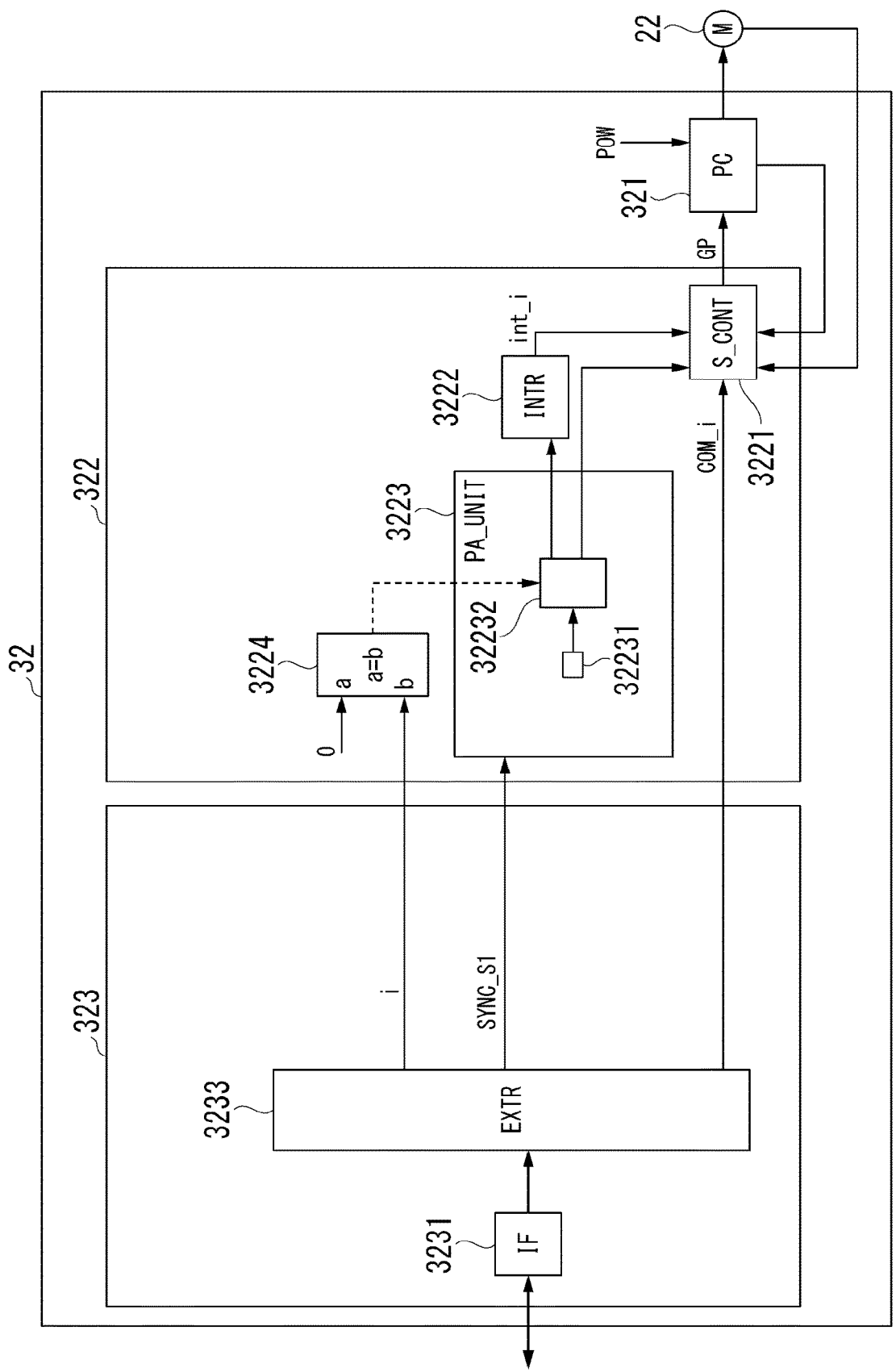
FIG. 3B is a diagram illustrating a configuration of a second drive device according to the first embodiment.

FIG. 3B is a diagram illustrating the configuration of the second drive device 32 according to the first embodiment. The second drive device 32 illustrated in FIG. 3B includes, for example, a second power converter 321, a second controller 322, and a second communication processing unit 323.

The second power converter 321 supplies second electric power for conveying an object to the winding (not illustrated) of the second electric motor 22. The second controller 322 controls the second power converter 321. The second communication processing unit 323 communicates with the master device 10. The second power converter 321, the second controller 322, and the second communication processing unit 323 correspond to the first power converter 311, the first controller 312, and the first communication processing unit 313. The second power converter 321, the second controller 322, and the second communication processing unit 323 can have the same configurations as the first power converter 311, the first controller 312, and the first communication processing unit 313, respectively. These elements will be referred to by the same reference signs obtained by replacing 100 digit values of the reference signs of the first drive device 31 with the reference signs in the second drive device 32, and detailed description thereof will be omitted.

A speed adjusting process which is performed by the first drive device 31 will be described below with reference to FIG. 4.

Figure 4:
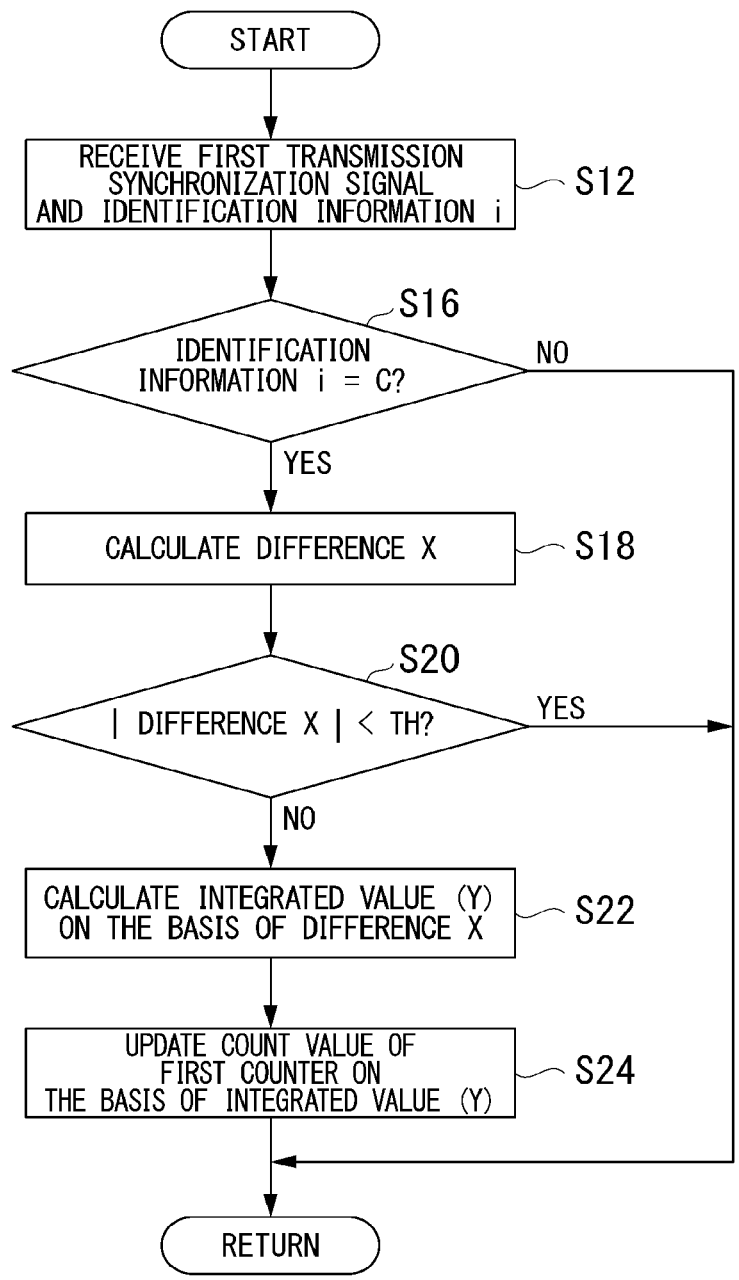
FIG. 4 is a flowchart illustrating a speed adjusting process which is performed by the drive devices according to the first embodiment.

FIG. 4 is a flowchart illustrating a speed adjusting process which is performed by the first drive device 31 according to the first embodiment. For example, the first controller 312 of the first drive device 31 performs the following process as the speed adjusting process.

The first controller 312 receives a first transmission synchronization signal transmitted by the master device 10 and identification information i for identifying each first period in the reference period (Step S12).

The first controller 312 determines whether the value of the identification information i is the same as a constant C (Step S16). The value of the constant C is determined in advance and the value may be, for example, 0.

When the value of the identification information i is not the same as the constant C, the first controller 312 ends the series of processes. When the value of the identification information i is the same as the constant C, the first controller 312 calculates a difference X (Step S18). For example, the difference X is a phase difference between the phase of the reference period of the master device 10 and the phase of the first controller 312.

The first controller 312 determines whether the absolute value of the difference X is less than a predetermined threshold value TH (Step S20). When the absolute value of the difference X is less than the threshold value TH, the first controller 312 ends the series of processes.

When the absolute value of the difference X is greater than the threshold value TH, the first controller 312 calculates an integrated value Y of an interruption counter on the basis of the difference X (Step S22). For example, the threshold value TH is a positive real number close to 0.

Then, the first controller 312 writes the calculated integrated value Y of the interruption counter to a variable area in the storage area of a storage unit 314 (FIG. 8) and updates the variable area to change the current value of the interruption counter stored in the variable area to the integrated value Y of the interruption counter (Step S24). The first counter 31232 sequentially updates the value in the variable area independently of the process of Step S24.

The first controller 312 synchronizes the first drive device 31 with the master device 10 by performing the above-mentioned processes.

The second controller 322 of the second drive device 32 can synchronize the second drive device 32 with the master device 10 by performing the same processes as the processes which are performed by the first controller 312 and which are illustrated in FIG. 4.

Control for synchronizing the control period of each drive device 30 with the timing at which a signal is supplied by the master device 10 will be described below.

Figure 5:
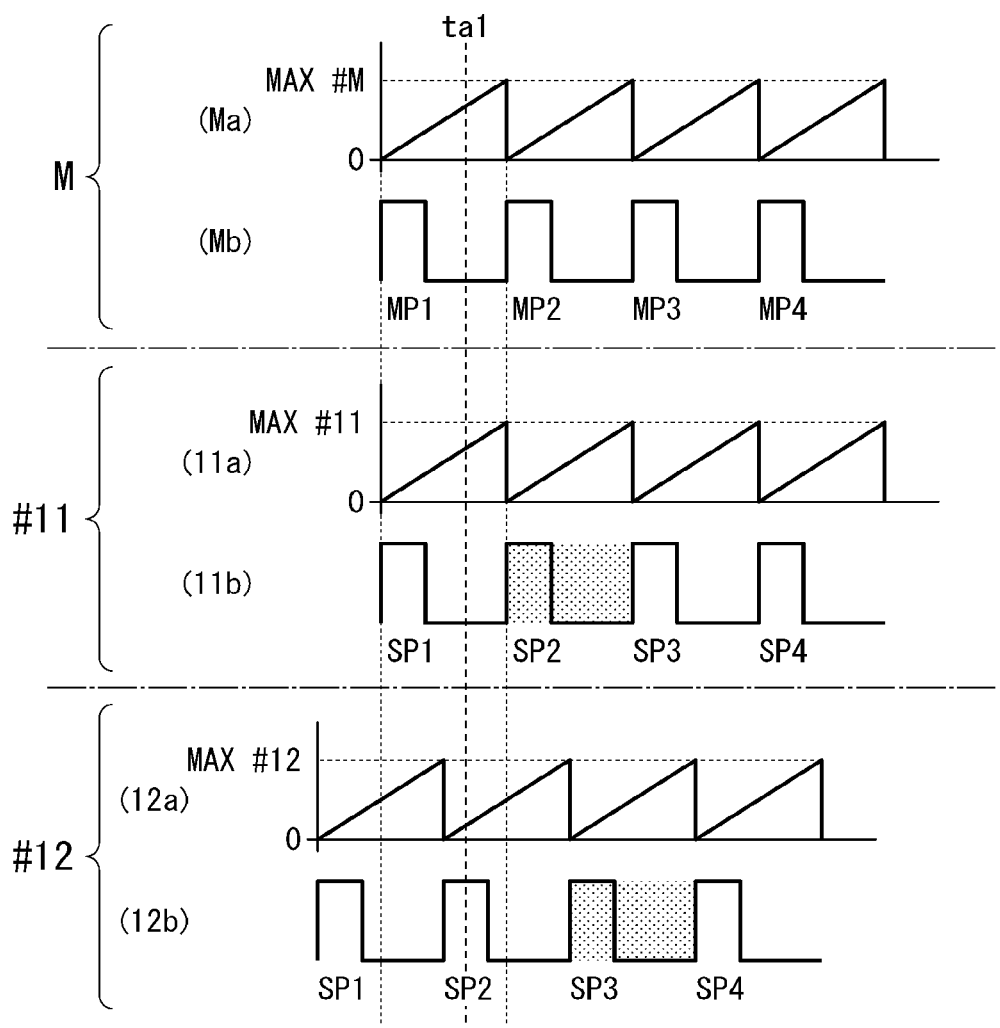
FIG. 5 is a diagram illustrating a phase relationship of a control period between a master device and a drive device according to a first comparative example.
Figure 6:
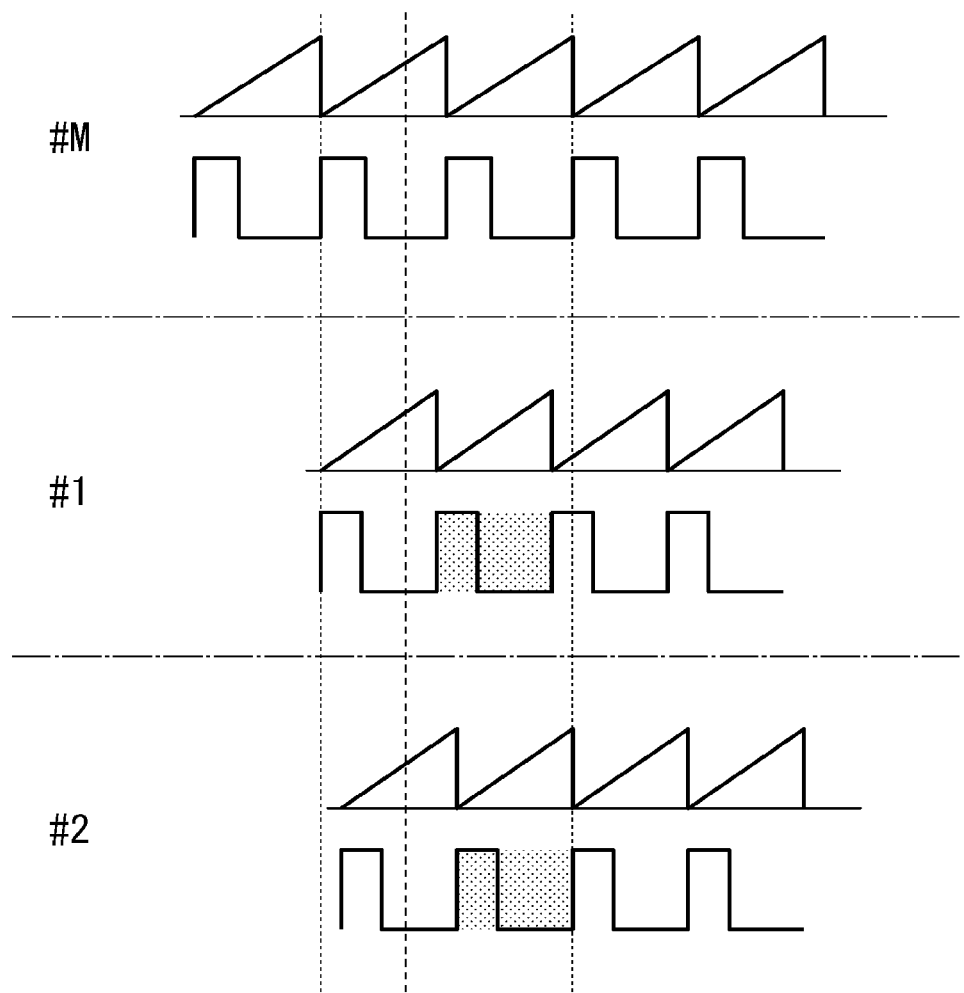
FIG. 6 is a diagram illustrating operations when a length of a control period of a master device and a length of a synchronization period of a drive device are different from each other according to a second comparative example.

First, a comparative example will be described below with reference to FIGS. 5 and 6 for the purpose of comparison with the embodiment. FIG. 5 is a diagram illustrating a phase relationship of a control period between a master device #M and drive devices #11 and #12 in a first comparative example. The control periods of the master device #M and the drive devices #11 and #12 in the first comparative example have the same length.

A triangular wave (Ma) and a rectangular wave (Mb) associated with the control period of the master device #M are illustrated in the first stage of FIG. 5, a triangular wave (11a) and a rectangular wave (11b) associated with the control period of the drive device #11 are illustrated in the second stage of FIG. 5, and a triangular wave (12a) and a rectangular wave (12b) associated with the control period of the drive device #12 are illustrated in the third stage of FIG. 5.

For example, the triangular wave Ma in the first stage of FIG. 5 indicates a count value of clocks (or steps) which are used for control by the master device #M. For example, a counter (not illustrated) of the master device #M counts the number of detected clocks and represents the count value as a value of from 0 to MAX #M. When the count value of the counter increases sequentially and reaches MAX #M, the counter sets the count value to 0 when the next clock is detected. For example, when the count value is set to 0, the master device #M performs an interruption process with a fixed period. The timing of the interruption process is represented by the rectangular wave (Mb).

The master device #M performs processes relevant to the rectangular wave (Mb) in the first stage of FIG. 5 in each control period using pulses MP1 to MP4 of the rectangular wave (Mb) as a trigger for the interruption process.

Description of the triangular wave and the rectangular wave in the second stage and the third stage of FIG. 5 is the same as that of the triangular wave and the rectangular wave in the first stage of FIG. 5, and this description may be referred to therefor. They are different in that the count value of clocks of the drive device #11 changes from 0 to MAX #11, the count value of clocks of the drive device #12 changes from 0 to MAX #12, and the drive devices #11 and #12 use the pulses SP1 to SP4 as triggers of the interruption process.

Here, as a result of comparison between the rectangular wave (Mb) in the first stage of FIG. 5 and the rectangular wave (11b) in the second stage of FIG. 5, positions in a time axis direction of the first to fourth control periods corresponding to the pulses MP1 to MP4 in the first stage are aligned with positions in the time axis direction of the first to fourth control periods corresponding to the pulses SP1 to SP4 in the second stage. This state is a state in which no phase difference is generated between the phase of the control period of the master device #M and the phase of the control period of the drive device #11.

On the other hand, as a result of comparison between the rectangular wave (Mb) in the first stage of FIG. 5 and the rectangular wave (12b) in the third stage of FIG. 5, the positions in the time axis direction of the first to fourth control periods corresponding to the pulses MP1 to MP4 in the first stage are different from positions in the time axis direction of the first to fourth control periods corresponding to the pulses SP1 to SP4 in the third stage. This state is a state in which a phase difference is generated between the phase of the control period of the master device #M and the phase of the control period of the drive device #12.

In this state, for example, even when it is assumed that the master device #M ends a speed changing command to the drive device #11 and the drive device #12 at time ta1 and the drive device #11 and the drive device #12 can simultaneously receive the commands, a difference is generated between times at which processing of the control period in which the commands are processed is started. This is because there is a phase difference between the control period of the drive device #11 and the control period of the drive device #12 as illustrated in FIG. 5. For example, hatching applied to the rectangular waves (Mb), (11b), and (12b) in the stages of FIG. 5 represents the control periods in which the speed changing command transmitted at time ta1 is processed by the drive devices 30. When a phase difference is generated between the control periods in this way, a difference is generated between the times at which electric power supplied to the electric motors is switched. The maximum value in difference in the time axis direction is the length of the control period which is common to the drive device #11 and the drive device #12. Accordingly, an influence of a phase difference in control period between the drive device #11 and the drive device #12 in the first comparative example may not be completely decreased unless they are synchronized with each other and it may be difficult to secure an alignment property.

Operations when the lengths of the control periods of a master device and a drive device in a second comparative example are different from each other will be described below with reference to FIG. 6. FIG. 6 is a diagram illustrating the operations when the length of the control period of the master device and the length of the control period of the drive device in the second comparative example are different from each other. The length of the control period of the master device and the length of the control period of the drive device are different from each other in FIG. 6. Accordingly, since the length of the control period of the master device and the length of the control period of the drive device in the second comparative example are not aligned with each other, an influence of the phase difference between the control periods cannot be reduced and an alignment property thereof cannot be improved.

Figure 7:
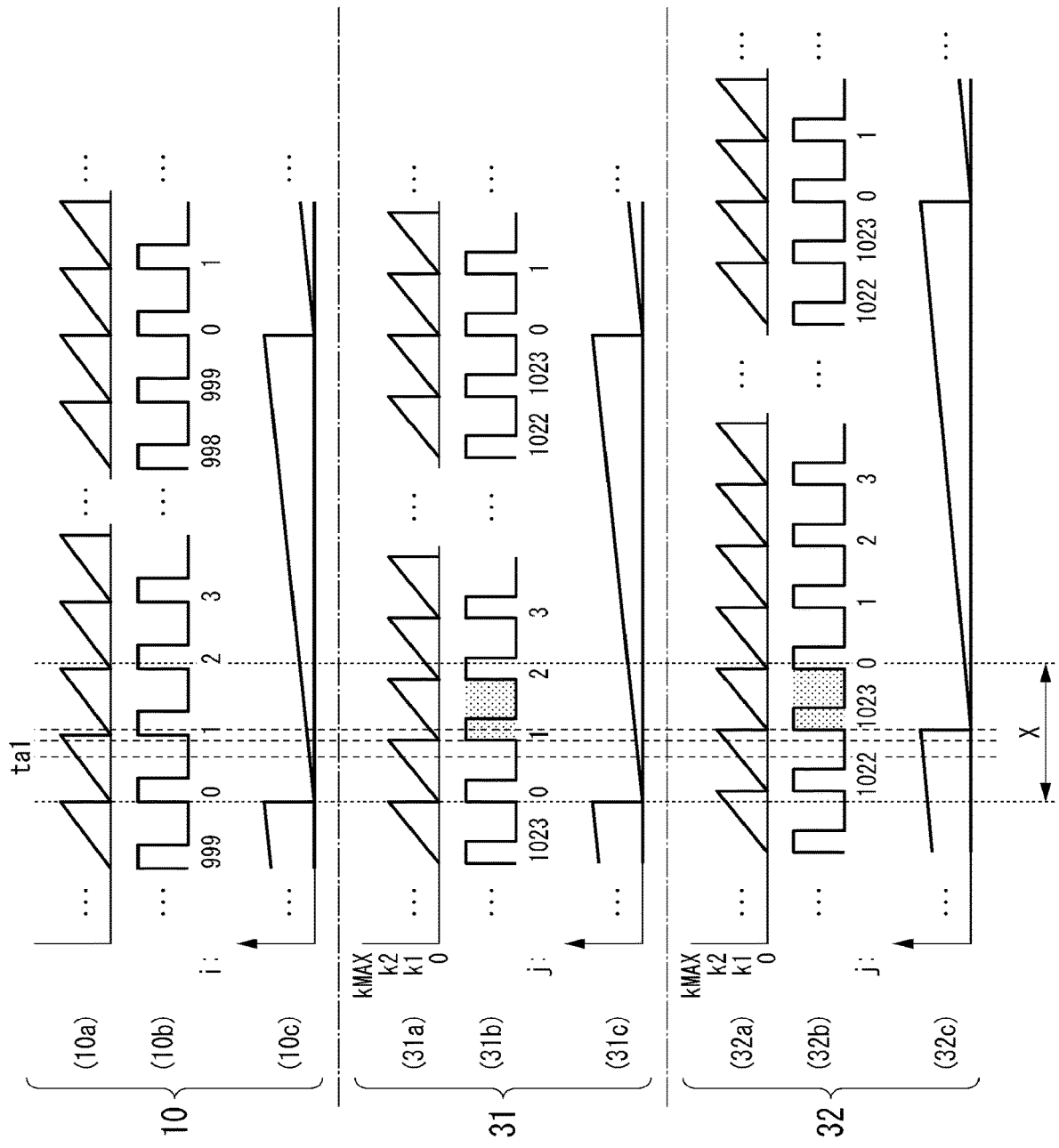
FIG. 7 is a diagram illustrating operations when the master device, the first drive device, and the second drive device according to the first embodiment are combined.

Combinations of the master device 10, the first drive device 31, and the second drive device 32 will be described below with reference to FIG. 7. FIG. 7 is a diagram illustrating operations when the master device 10, the first drive device 31, and the second drive device 32 in the first embodiment are combined. As described above in the embodiment, the length of the control period (the first period) of the master device 10 is different from the length of the first control period of the first drive device 31 and is also different from the length of the second control period of the second drive device 32.

Triangular waves (10a) and (10c) and a rectangular wave (10b) associated with the control period of the master device 10 are illustrated in the first stage of FIG. 7, triangular waves (31a) and (31c) and a rectangular wave (31b) associated with the control period of the first drive device 31 are illustrated in the second stage of FIG. 7, and two triangular waves (32a) and (32c) and a rectangular wave (32b) associated with the control period of the second drive device 32 are illustrated in the third stage of FIG. 7.

Two triangular waves (for example, a triangular wave (10a) and a triangular wave (10c)) illustrated in each stage of FIG. 7 are different from each other in the length of one period in the time axis direction. One period of the triangular wave (10a) is shorter than that of the triangular wave (10c). The relationship between the triangular wave (10a) and the rectangular wave (10b) corresponds to the relationship between the triangular wave (Ma) and the rectangular wave (Mb) in each stage of FIG. 5. The second stage and the third stage of FIG. 7 have the same tendency.

The first period of the master device 10 is 1/M of the reference period. The first period of the master device 10 corresponds to the period of the triangular wave (10a) and the reference period of the master device 10 corresponds to the period of the triangular wave (10c). The first control period of the first controller 312 is 1/N of the reference period. The first period of the first controller 312 corresponds to the period of the triangular wave (31a) and the reference period of first controller 312 corresponds to the period of the triangular wave (31c). The second period of the second controller 322 is 1/N of the reference period. The second control period of the second controller 322 corresponds to the period of the triangular wave (32a) and the reference period of second controller 322 corresponds to the period of the triangular wave (32c). The value of M and the value of N are integers which are different from each other.

The values of the triangular waves (10a), (31a), and (32a) in which one period is shorter in the time axis direction are the count values of clocks which are used for processing by the master device 10 and the drive devices 30. For example, the value of the triangular wave (a) of the master device 10 is the count value of the counter 13. The value of the triangular wave (31a) of the first drive device 31 is the count value of the first counter 31232 in the phase adjusting unit 3123. The value of the triangular wave (32a) of the second drive device 32 is the count value of the second counter 32232 in the phase adjusting unit 3223.

For example, the first controller 312 of the first drive device 31 acquires the state of the first electric motor 21 and the state of the first power converter 311 until the count value of the first counter 31232 changes from 0 to k1 (process A), generates a command value for the first power converter 311 until the count value changes from k1 to k2 (process B), and generates a first gate pulse GP for driving the first electric motor 21 until the count value changes from k2 to kMAX31 (process C). The first controller 312 performs processes A to C in one first control period in which the count value of the first counter 31232 changes from 0 to kmax and repeatedly performs processes A to C for each first control period.

For example, the second controller 322 of the second drive device 32 acquires the state of the second electric motor 22 and the state of the second power converter 321 until the count value of the second counter 32232 changes from 0 to k1, generates a command value for the second power converter 321 until the count value changes from k1 to k2, and generates a second gate pulse GP for driving the second electric motor 22 until the count value changes from k2 to kMAX32 The second controller 322 performs processes A to C in one second control period in which the count value of the second counter 32232 changes from 0 to kmax and repeatedly performs processes A to C for each second control period. Processes A to C are an example of a first process.

The triangular wave (10c) in which one period is longer in the time axis direction is illustrated for explanation, and the drive system 1 may not count the value thereof.

For example, the period of the triangular wave (10c) (referred to as a reference period) illustrated in the first stage of FIG. 7 is N times the control period of the master device 10. The waveforms illustrated in FIG. 7 are based on the premise that the value of N is 1000, and illustration of some waveforms is omitted. Numerals along the rectangular wave (10b) illustrated in the first stage of FIG. 7 indicate values of identification information i of the control period which sequentially increases from 0 to 999. The amplitude of the triangular wave (10c) schematically indicates the value of the identification information i. The actual identification information i does not change continuously but changes in a stepped shape in synchronization with a switching timing of the control period.

In the state of the first drive device 31 illustrated in the second stage of FIG. 7, the phase is adjusted well by using one first control period for phase adjustment to the reference period of the master device 10, and thus the difference X is 0. M times the first control period corresponds to the reference period of the master device 10. The waveforms illustrated in the second stage of FIG. 7 are based on the premise that the value of M is 1024. Numerals along the rectangular wave (31b) schematically indicate values of identification information j of the control period which sequentially increases from 0 to 1023. The amplitude of the triangular wave (31c) schematically indicates the value of the identification information j. The actual identification information j does not change continuously but changes in a stepped shape in synchronization with a switching timing of the first control period.

In the state of the second drive device 32 illustrated in the third stage of FIG. 7, the phase of the control period is not adjusted well and thus the difference X is generated. Description of the waveforms is the same as that of the first drive device 31 in the second stage of FIG. 7. The second drive device 32 illustrated in the third stage of FIG. 7 is different from the first drive device 31 in the second stage of FIG. 7, in that the state of the first drive device 31 in the second stage of FIG. 7 is aligned with the timing of the reference period of the master device 10 but the state of the second drive device 32 in the third stage of FIG. 7 is not aligned therewith.

The process which is performed by the first drive device 31 will be described below by comparison between the first stage and the second stage of FIG. 7.

The first drive device 31 determines a specific first synchronization signal out of a plurality of first synchronization signals acquired by reception of the first transmission synchronization signal a plurality of times using the identification information i, and adjusts the phase of the specific first synchronization signal. The plurality of first synchronization signals in FIG. 7 correspond to the rectangular wave (31b) in the second stage of FIG. 7. The specific first synchronization signal in this case is one rectangular wave (pulse) which corresponds to the timing at which the identification information i changes from 999 to 0 out of the rectangular waves (pulses) corresponding to the values of the identification information j (0 to 1023). Therefore, the first controller 312 of the first drive device 31 can adjust the phase of the period of the rectangular wave (31b) of the first drive device 31 (the first control period) such that the period of the rectangular wave (31b) of the first drive device 31 (the first control period) is synchronized with the timing at which the identification information i changes from 999 to 0.

In this case, the control period of the master device 10 (the period of the pulses of the rectangular wave (10b) in the first stage of FIG. 7) and the control period of the first drive device 31 (the period of the pulses of the rectangular wave (31b) in the second stage of FIG. 7) are strictly different from each other. In the phase relationship illustrated in FIG. 7, the first control period in which the identification information j of the first drive device 31 is identified as being 0 becomes close to the phase of the control period in which the identification information i of the master device 10 is identified as being 0. Therefore, the first drive device 31 adjusts the phase of the rectangular wave (31b) of the first drive device 31 in the second stage of FIG. 7 in the control period in which the identification information i allocated to the rectangular wave (10b) of the master device 10 in the first stage of FIG. 7 is 0.

Even when adjustment to a good phase relationship is performed in this way, the reference phase of the rectangular wave of the master device 10 in which the identification information i in the first stage of FIG. 7 changes from 1 to 999 and the reference phase of the rectangular wave of the first drive device 31 in which the identification information j in the second stage of FIG. 7 changes from 1 to 1023 are not aligned with each other. Accordingly, the first drive device 31 can stably adjust the phase with respect to the reference period of the master device 10 by performing control such that the phase is adjusted when the identification information i is 0 and the phase is not adjusted when the identification information i is not 0.

On the other hand, the second drive device 32 in the third stage of FIG. 7 has a phase relationship in which the identification information j allocated to the rectangular wave (32b) of the second drive device 32 in the third stage of FIG. 7 is not 0 even when the identification information i allocated to the rectangular wave (10b) of the master device 10 in the first stage of FIG. 7 is 0. Accordingly, since the phases of the waveforms in the third stage of FIG. 7 match the phase of the reference period of the master device 10, the difference X is generated with respect to the phase of the reference period of the master device 10 unlike the phases of the waveforms in the second stage of FIG. 7 illustrating a state in which the difference X is not generated.

In the phase relationship illustrated in the third stage of FIG. 7, the second controller 322 of the second drive device 32 adjusts the phase of the second control period similarly to the first controller 312 of the first drive device 31. More specifically, similarly to the first drive device 31, the second drive device 32 determines a specific second synchronization signal out of a plurality of second synchronization signals acquired by reception of the first transmission synchronization signal a plurality of times using the identification information i and adjusts the phase of the specific second synchronization signal. The second synchronization signals and the specific second synchronization signal which are handled by the second drive device 32 are signals in the second drive device 32 and are signals which correspond to the first synchronization signals and the specific first synchronization signal of the first drive device 31 which is a different device. Accordingly, the second controller 322 of the second drive device 32 can match the phase of the second control period with the phase of the reference period of the master device 10 illustrated in the first stage, and thus can acquire the waveforms with the phase relationship illustrated in the second stage of FIG. 7.

By causing the drive devices 30 other than the first drive device 31 and the second drive device 32 to perform the same processes, the reference phase of the rectangular wave of the master device 10 and the reference phase of the rectangular wave of each drive device 30 are aligned.

Figure 8:
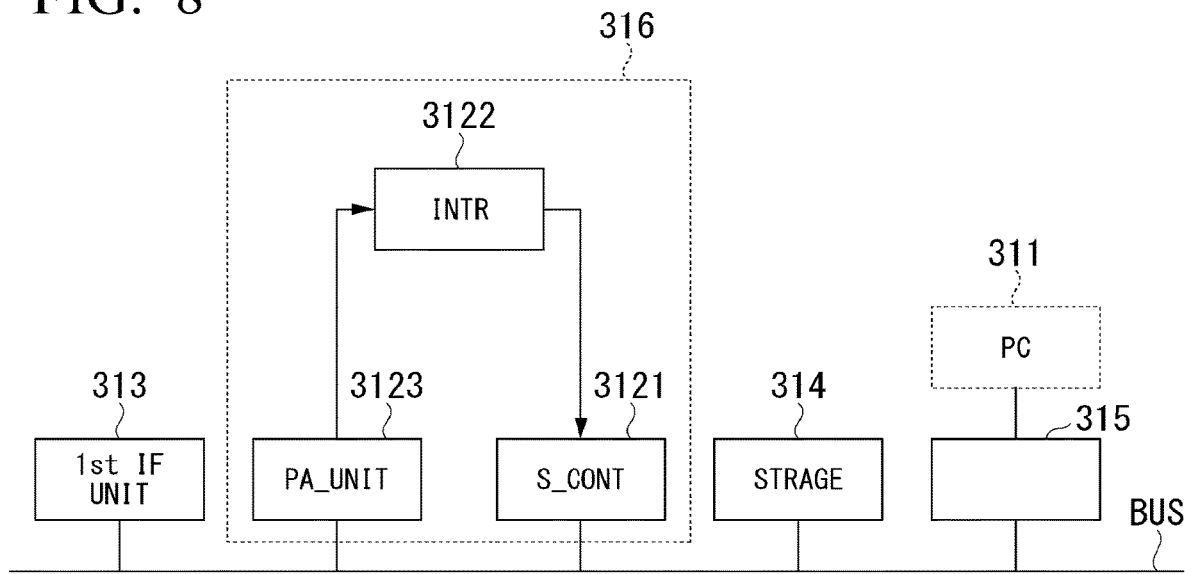
FIG. 8 is a diagram illustrating a configuration of the first drive device according to the first embodiment.

FIG. 8 is a diagram illustrating the configuration of the first drive device 31 according to this embodiment.

The first drive device 31 includes, for example, a storage unit 314 (STRAGE in FIG. 8), an input and output unit 315, and a calculation processing unit 316. The first drive device 31 is an example of a computer.

The storage unit 314 is realized by a ROM, a RAM, an HDD, a flash memory, and the like. Storage areas for storing various types of setting information for causing the first controller 312 to function, basic programs such as an OS, and application programs are provided in the storage unit 314.

The input and output unit 315 acquires, for example, information of a position of a shaft of the first electric motor 21 and information of an output state of the first power converter 311 as input information and outputs gate signals GP. The input and output unit 315 may include, for example, a display unit such as a liquid crystal display that displays various types of information and an operation detecting unit. The display unit and the operation detecting unit may be combined and configured as a touch panel.

The calculation processing unit 316 includes a second processor that executes a software program. The second processor may be referred to as a CPU or an FPGA. The calculation processing unit 316 along with the first communication processing unit 313, the storage unit 314, and the input and output unit 315 is connected to a bus BUS. The calculation processing unit 316 realizes some or all functions of the first controller body 3121, the first interruption signal generating unit 3122, the phase adjusting unit 3123, and the comparator 3124 by executing the software program.

The software program which is executed by the second processor of the calculation processing unit 316 may be stored in the storage unit 314 in advance, or may be downloaded from an external device or a portable storage medium which is not illustrated or via a communication line.

A part or all of the first communication processing unit 313 other than hardware for connection to the network NW may be realized by causing the calculation processing unit 316 to execute the software program or may be realized by a calculation processing unit other than the calculation processing unit 316.

According to the above embodiment, the drive system 1 includes the first drive device 31, the second drive device 32, and the master device 10. The master device 10 transmits identification information of each first period and a first transmission synchronization signal for each first period of the reference period. The first controller 312 of the first drive device 31 adjusts a phase of each first control period such that the first control period is synchronized with a timing (referred to as a first reference timing) associated with a specific first synchronization signal out of a plurality of first synchronization signals which are acquired by reception of the first transmission synchronization signal a plurality of times using the identification information. In addition, the first controller 312 controls the first power converter 311 using the first control period. The second controller 322 of the second drive device 32 adjusts a phase of each second control period such that the second control period is synchronized with a timing (referred to as a second reference timing) associated with a specific second synchronization signal out of a plurality of second synchronization signals which are acquired by one of reception of the first transmission synchronization signal a plurality of times and reception of the second transmission synchronization signal a plurality of times using the identification information. In addition, the second controller 322 controls the second power converter 321 using the second control period. Accordingly, the drive system 1 can further enhance an alignment property of a plurality of electric motors 20.

The specific first synchronization signal may be a first synchronization signal corresponding to the time at which the first drive device 31 has detected the identification information i of a specific value. Similarly, the specific second synchronization signal may be a second synchronization signal corresponding to the time at which the second drive device 32 has detected the identification information i of a specific value. The first drive device 31 may specify the specific first synchronization signal using the common value of the identification information i. The second drive device 32 may specify the specific second synchronization signal using the common value of the identification information i.

The first controller 312 may perform control such that the first synchronization signals not corresponding to the specific first synchronization signal out of the plurality of first synchronization signals are excluded from signals to be controlled at the time of synchronization of the first control period. The second controller 322 may perform control such that the second synchronization signals not corresponding to the specific second synchronization signal out of the plurality of second synchronization signals are excluded from signals to be controlled at the time of synchronization of the second control period.

For example, the first drive device 31 may receive the first transmission synchronization signal a plurality of times, select a specific first synchronization signal corresponding to a first reference timing in the reference period out of a plurality of first synchronization signals acquired by reception of the first transmission synchronization signal a plurality of times, and adjust the first control timing at which the process associated with control of the first electric motor 21 is started using the specific first synchronization signal. In addition, the second drive device 32 may receive the first transmission synchronization signal a plurality of times, select a specific second synchronization signal corresponding to the first reference timing in the reference period out of a plurality of second synchronization signals acquired by reception of the first transmission synchronization signal a plurality of times, and adjust the second control timing at which the process associated with control of the second electric motor 22 is started using the specific second synchronization signal.

In this way, by causing each of the first controller 312 and the second controller 322 to select a target signal, the drive system 1 can further enhance an alignment property of a plurality of electric motors 20.

When a target signal of which the phase is to be adjusted is limited as described above, a combination in which the reference length of the first period which is used for control by the master device 10 and the reference length of the first control period of the first drive device 31 and the second control period of the second drive device 32 are different from each other may be employed. By performing control such that some of the plurality of first synchronization signals and some of the plurality of second synchronization signals are excluded from the target signal of which the phase is to be adjusted, the drive system 1 can secure an alignment property of the first electric motor 21 and the second electric motor 22 and control the electric motors.

By causing the master device 10 and the first drive device 31 to cooperate with each other and causing the master device 10 and the second drive device 32 to cooperate with each other, the master device 10 can control the first drive device 31 and the second drive device 32.

Second Embodiment

A drive system 1A according to a second embodiment will be described below.

For example, the drive system 1A has the same configuration as the drive system 1 illustrated in FIG. 1. The master device 10 in the drive system 1A according to the first embodiment transmits a common first transmission synchronization signal to the drive devices 30. In the second embodiment, the master device 10A individually transmits transmission synchronization signals to drive devices 30A.

Figure 9:
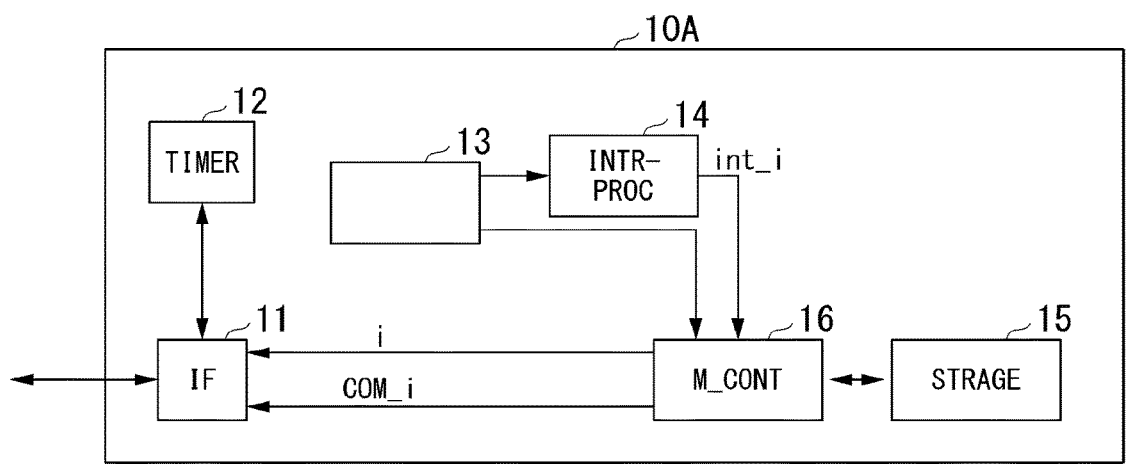
FIG. 9 is a diagram illustrating a configuration of a master device according to a second embodiment.

FIG. 9 is a diagram illustrating the configuration of a master device 10A according to this embodiment.

The master device 10A additionally includes a timer 12 (TIMER in FIG. 2) in addition to the elements of the master device 10.

The timer 12 includes, for example, a timepiece and a timepiece adjusting unit that performs a time setting process of the timepiece, which are not illustrated in FIG. 9. The timer 12 communicates with the drive devices 30A via the interface unit 11 and the network NW. The timer 12 causes each drive device 30A to adjust the time such that time information on the drive device 30A side is set to time information on the master device 10 side by communicating with each drive device 30A. The master device 10A may use an existing protocol for a process associated with the adjustment of the time. For example, a precision time protocol (PTP: IEEE (Institute of Electrical and Electronics Engineers) 1588) can be used as the protocol which is used for adjustment of the time. In this case, at the time of transmission of a signal (a packet) to the network NW, the interface unit 11 adds time information of the timer 12 to a packet and transmits the packet.

The master device 10A generates a synchronization signal for aligning the drive devices 30 (referred to as a transmission synchronization signal). For example, the master device 10A generates transmission synchronization signals which are individually transmitted to the drive devices 30.

More specifically, the master device 10A generates a first transmission synchronization signal and a second transmission synchronization signal for each first period. The first transmission synchronization signal and the second transmission synchronization signal are examples of the transmission synchronization signal. Thereafter, the master device 10A supplies the first transmission synchronization signal to the first drive device 31 and supplies the second transmission synchronization signal to the second drive device 32 for each first period. The same is true of the third drive device 33 and the fourth drive device 34.

Figure 10A:
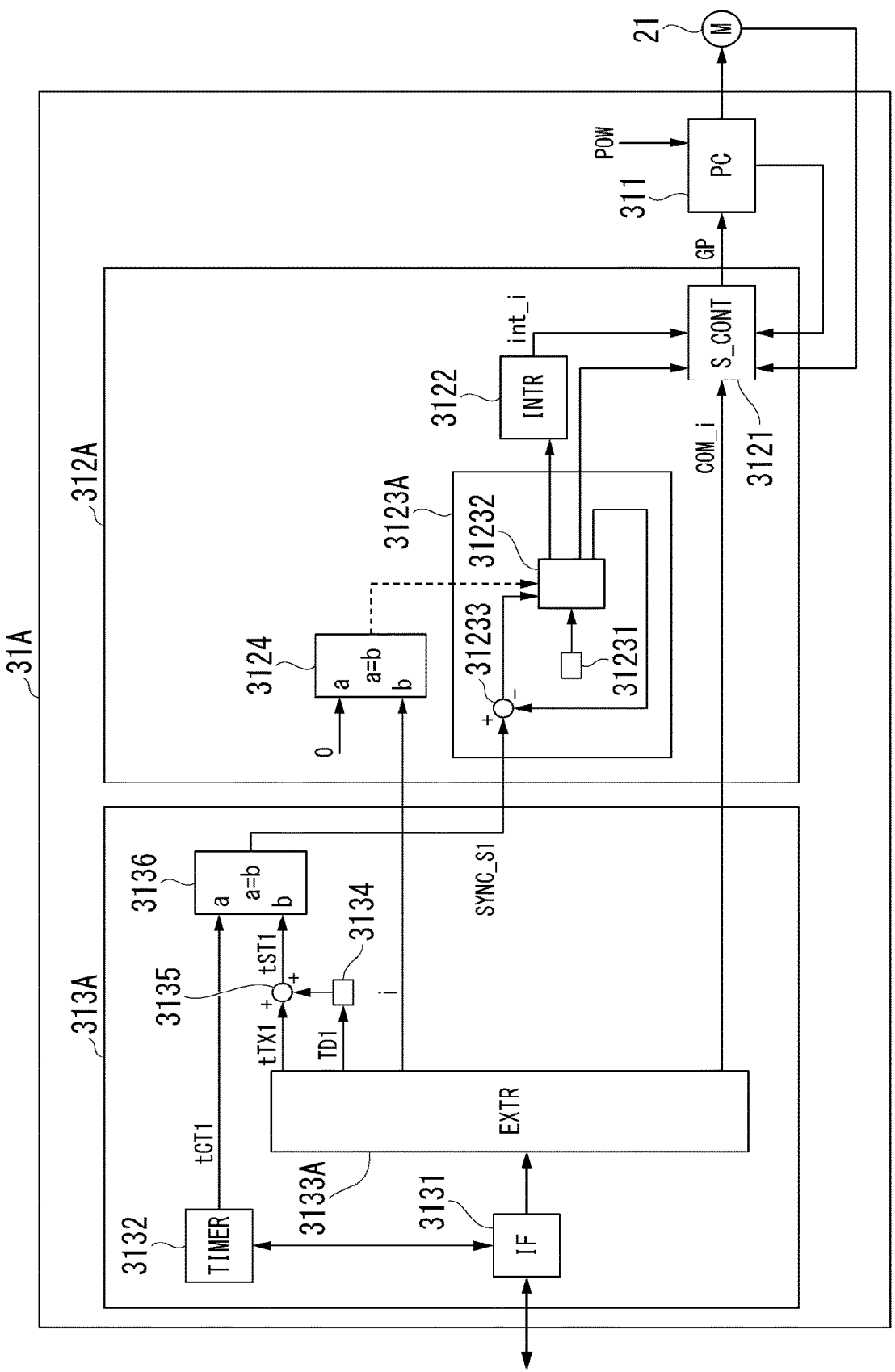
FIG. 10A is a diagram illustrating a configuration of a first drive device according to the second embodiment.

The first drive device 31A and the second drive device 32A will be described below with reference to FIGS. 10A and 10B. FIG. 10A is a diagram illustrating a configuration of the first drive device 31A according to this embodiment.

The first drive device 31A includes a first controller 312A and a first communication processing unit 313A instead of the first controller 312 and the first communication processing unit 313 of the first drive device 31.

The first communication processing unit 313A communicates with the master device 10A via the network NW and supplies various types of information acquired from the master device 10A to the first controller 312A.

The first communication processing unit 313A includes an interface unit 3131A and an extraction processing unit 3133A (EXTR in FIG. 10A) instead of the interface unit 3131 and the extraction processing unit 3133 of the first communication processing unit 313, and further includes a delay time storage unit 3134, an adder 3135, and a comparator 3136.

The interface unit 3131A is connected to the network NW and acquires various types of information which is transmitted by the master device 10A by communicating with the master device 10A via the network NW. Various types of information which is transmitted by the master device 10A includes time information of the master device 10A, information on a command value COM_i which is transmitted to the first drive device 31 by the master device 10A, and identification information i of the control period of the master device 10A.

A timer 3132 includes, for example, a first timepiece and a timepiece adjusting unit that performs a time setting process of the first timepiece, both of which are not illustrated in FIG. 10A. The timer 3132 takes synchronization with the time information of the timer 12 of the master device 10A by communicating with the master device 10A via the interface unit 3131A and the network NW. The timer 3132 adjusts the time of the first timepiece in this way. The timer 3132 uses a protocol common to the master device 10A for the process associated with adjustment of the time. The timer 3132 supplies the adjusted time information to a first input a of the comparator 3136.

Precision of the time of the timer 3132 is limited by the protocol which is used for the process. When stability higher than the stability of the time based on the protocol which is used for the process is required, a stabilization circuit such as a phase locked loop (PLL) may be provided in a subsequent stage to decrease a variation in time due to the protocol.

The extraction processing unit 3133A acquires various types of information which are transmitted by the master device 310A from the interface unit 3131A, extracts the acquired information, and supplies the extracted information to corresponding supply destinations.

For example, the extraction processing unit 3133A supplies a value of a delay time (TD1 in FIG. 10A) designated by the master device 10A to the delay time storage unit 3134 which will be described later to calculate the timing at which synchronization is actually taken, and supplies time information associated with the time (tTX1 in FIG. 10A) at which the packet of the first transmission synchronization signal has been transmitted by the master device 10A to a first input of the adder 3135. The time information associated with the time at which the master device 10A has transmitted the packet is an example of time information of the master device 10A.

The extraction processing unit 3133A supplies identification information i added to the packet of the first transmission synchronization signal transmitted by the master device 10A (such as the identification information i indicating the control period in which the packet has been transmitted) to the phase adjusting unit 3123A.

For example, the delay time storage unit 3134 stores the value of the delay time designated by the master device 10A in a storage area in which a constant value can be stored. The delay time storage unit 3134 supplies the stored value of the delay time to a second input of the adder 3135. The delay time storage unit 3134 may use a correction calculating data table which will be described later as the storage area in which a constant value can be stored.

The adder 3135 adds the value tTX1 of the time information associated with the time at which the master device 10A has transmitted the packet of the first transmission synchronization signal and the value TD1 of the delay time stored in the delay time storage unit 3134 and supplies the result of calculation tST1 to the comparator 3136. The result of calculation tST1 is a value for designating the time at which phase comparison for detecting an alignment property is performed.

The comparator 3136 detects that the time designated by the time information transmitted from the master device 10A has come, outputs a pulse of a positive logic when the designated time has come, and outputs logic 0 at times other than the designated time.

For example, information of a current time (tCT1 in FIG. 10A) which is output from the timer 3132 is supplied to a first input a of the comparator 3136, and time information tST1 for designating the time at which phase comparison for detecting an alignment property is supplied to a second input b thereof. The comparator 3136 detects that the time designated by the master device 10A has come from the result of comparison between tCT1 and tST1, and outputs a pulse of a positive logic at that time. The pulse of a positive logic is a first synchronization signal (SYNC_S1 in FIG. 10A) in which time has been adjusted on the basis of the time at which the master device 10A has transmitted a packet of the first transmission synchronization signal. The timing indicated by this pulse is an example of a first adjustment timing.

The first controller 312A includes a phase adjusting unit 3123A instead of the phase adjusting unit 3123 of the first controller 312.

The phase adjusting unit 3123A supplies a first clock which is used for discrete time control by the first controller body 3121 to the first controller body 3121, and supplies a second clock serving as a basis of the first control period to the first interruption signal generating unit 3122. The phase adjusting unit 3123A adjusts the length of the second clock, for example, on the basis of the first synchronization signal SYNC_S1 generated by the comparator 3136 and the result of comparison from the comparator 3124.

The phase adjusting unit 3123A includes, for example, a clock generating unit 31231, a first counter 31232, and a first phase comparator 31233.

The clock generating unit 31231 includes an oscillator which is not illustrated in FIG. 3A, generates a first reference clock signal with a fixed period, and supplies the generated first reference clock signal to the first counter 31232.

The first counter 31232 divides the frequency of the first reference clock signal into a predetermined number by counting the number of waves of the first reference clock signal supplied from the clock generating unit 31231, and generates a first clock signal of which the period is shorter than the length of the first control period.

The first counter 31232 generates a count value of the first count in which the result of counting the number of waves of the first clock signal from the starting point of the first control period indicates a value corresponding to the phase of the first control period. The first counter 31232 supplies the generated second clock signal to a second input of the first phase comparator 31233 to correct the phase and corrects the count value of the first counter depending on the conditions. The first counter 31232 generates a second clock with the first control period, for example, using one of the count value of the first count and the corrected count value of the first count, and supplies the generated second clock signal to the first interruption signal generating unit 3122.

Conditions for correcting the count value of the first count will be described below. The result of comparison of the time point of the first reference timing from the comparator 3124 may be used as the conditions. For example, when the logic value of the result of comparison from the comparator 3124 is "1," the conditions are defined as being satisfied.

The first synchronization signal SYNC_S1 is supplied to the first input of the first phase comparator 31233 from the extraction processing unit 3133. The first phase comparator 31233 compares the phase difference between the reference of the phase of the first synchronization signal SYNC_S1 supplied from the extraction processing unit 3133 and the reference of the phase of the first control period generated by the first counter 31232 using the count value of the first count and outputs the result of comparison. The result of comparison indicates a relationship between the timing of the first synchronization signal SYNC_S1 based on the time at which the master device 10A has transmitted the packet of the first transmission synchronization signal and the phase of the first control period. For example, the first phase comparator 31233 calculates a correction value of the count value of the first counter 31232 on the basis of the result of comparison.

As described above, the first controller 312A corrects the count value of the first count using the identification information i of each control period of the master device 10A with respect to the timing designated by the first synchronization signal SYNC_S1 on the basis of the information output from the extraction processing unit 3133A.

The constituent units of the first controller 312A will be summarized below.

The first counter 31232 generates a first clock signal by dividing the frequency of the first reference clock. The first counter 31232 generates the count value of the first count which is the result of counting the number of waves of the first clock signal from the starting point of the first control period. The first counter 31232 corrects the count value of the first count depending on the conditions of the time point of the first reference timing and generates the second clock with the first control period using one of the count value of the first count and the corrected count value of the first count. The count value of the first count is a value corresponding to the phase of the first control period.

The first phase comparator 31233 compares a phase difference between the reference of the phase of the first control period and the reference of the phase of the specific first synchronization signal included in the first synchronization signal SYNC_S1 using the count value of the first count acquired by the first counter 31232. The first phase comparator 31233 generates the correction value for correcting the count value of the first count at the time point of the first reference timing associated with the reference of the phase of the specific first synchronization signal such that a first difference X between the reference of the phase of the first control period and the reference of the phase of the specific first synchronization signal decreases on the basis of the result of comparison therebetween.

The first interruption signal generating unit 3122 generates a first interruption signal with the first control period on the basis of the second clock.

The first controller body 3121 starts the first process of controlling the first power converter 311 using the first clock signal on the basis of the first interruption signal. Accordingly, the first controller 312A controls the first power converter 311.

The second drive device 32 illustrated in FIG. 10B will be described below.

Figure 10B:
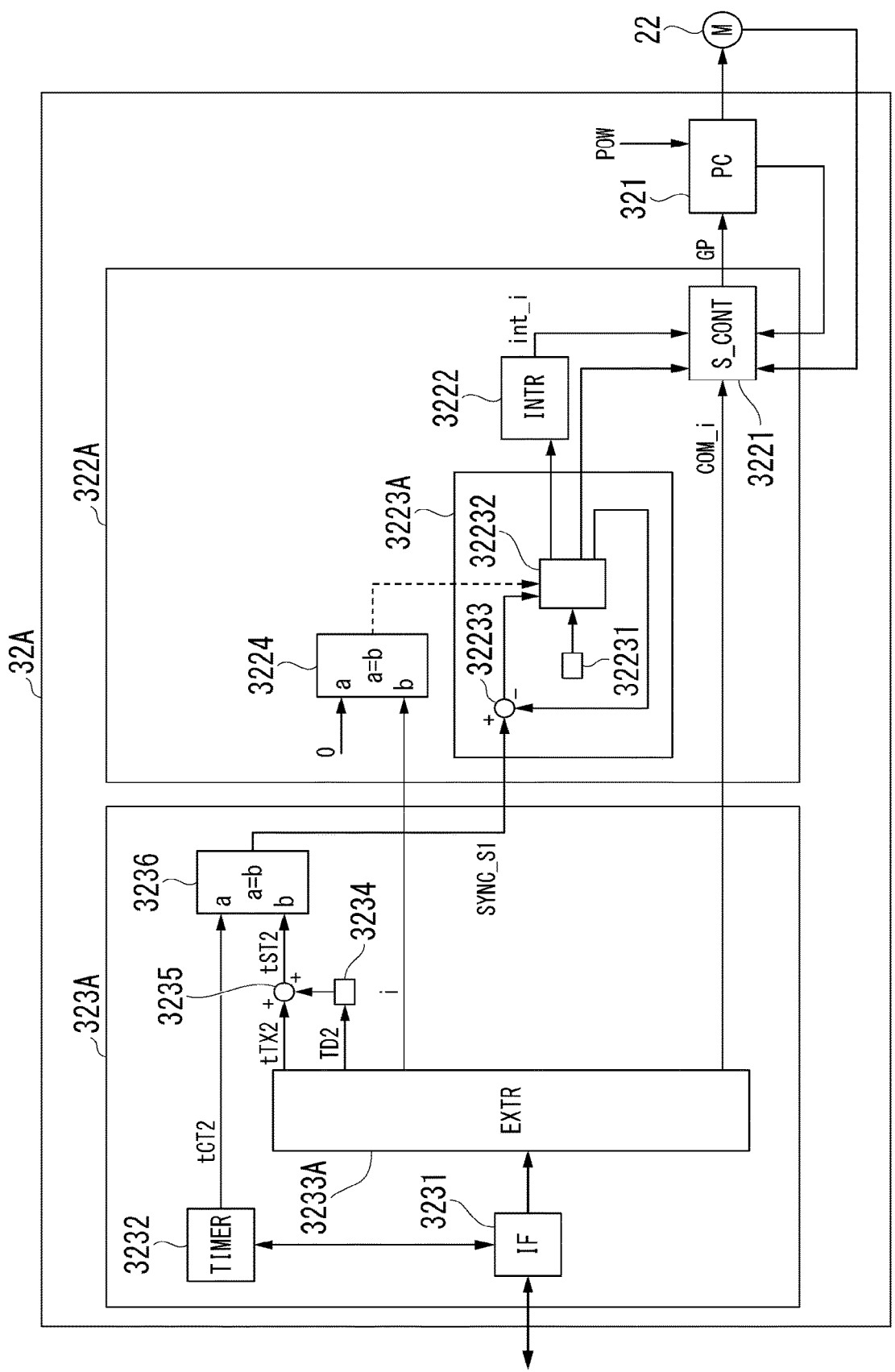
FIG. 10B is a diagram illustrating a configuration of a second drive device according to the second embodiment.

FIG. 10B is a diagram illustrating the configuration of the second drive device 32A according to this embodiment.

The second drive device 32A illustrated in FIG. 10B includes, for example, a second power converter 321, a second controller 322A, and a second communication processing unit 323A.

The second power converter 321 supplies second electric power for conveying an object to the winding of the second electric motor 22 (not illustrated). The second controller 322A controls the second power converter 321. The second communication processing unit 323A communicates with the master device 10.

The second controller 322A and the second communication processing unit 323A correspond to the first controller 312A and the first communication processing unit 313A. The second controller 322A and the second communication processing unit 323A can have the same configurations of the first controller 312A and the first communication processing unit 313. These constituent units of the second drive device 32A will be referred to by the same reference signs as the reference signs in the first drive device 31A.

The constituent units of the second controller 322A will be summarized below.

The second counter 32232 generates a third clock signal by dividing the frequency of the second reference clock. The second counter 32232 generates the count value of the third count which is the result of counting the number of waves of the third clock signal from the starting point of the second control period. The second counter 32232 corrects the count value of the third count depending on the conditions of the time point of the second reference timing and generates a fourth clock with the second control period using one of the count value of the third count and the corrected count value of the third count. The count value of the third count is a value corresponding to the phase of the second control period.

The second phase comparator 32233 compares a phase difference between the reference of the phase of the second control period and the reference of the phase of the specific second synchronization signal included in the second synchronization signal SYNC_S2 using the count value of the third count acquired by the second counter 32232. The second phase comparator 32233 generates the correction value for correcting the count value of the fourth count at the time point of the second reference timing associated with the reference of the phase of the specific second synchronization signal such that a second difference X between the reference of the phase of the second control period and the reference of the phase of the specific second synchronization signal decreases on the basis of the result of comparison therebetween.

The second interruption signal generating unit 3222 generates a second interruption signal with the second control period on the basis of the fourth clock.

The second controller body 3221 starts the second process of controlling the second power converter 321 using the fourth clock signal on the basis of the second interruption signal. Accordingly, the second controller 322A controls the second power converter 321.

Description of the first drive device 31A will be referred to for details of description of the second drive device 32A. Description of the third drive device 33A and the fourth drive device 34A is the same as that of the first drive device 31A and the second drive device 32A.

Adjustment of the phase of the control period which is performed by the drive devices 30 according to this embodiment will be described below.

FIG. 11 is a diagram illustrating a transmission time data table according to the second embodiment. The transmission time data table illustrated in FIG. 11 includes items of an identification number and time difference data. The item of the identification number stores data for identifying each drive device. The item of the time difference data stores data for defining a delay time from the starting point of the first control until a transmission synchronization signal is transmitted. For example, the transmission time data table is assigned to the storage unit 15 of the master device 10A.

FIG. 12 is a diagram illustrating a correction calculating data table according to the second embodiment. The correction calculating data table illustrated in FIG. 12 includes items of identification information, delay time, transmission time, and designated time. The item of the delay time stores data of the delay time designated by the master device 10A. The item of the transmission time stores data associated with the time at which the master device 10A has transmitted. The item of the designated time stores data of the designated time.

Figure 13:
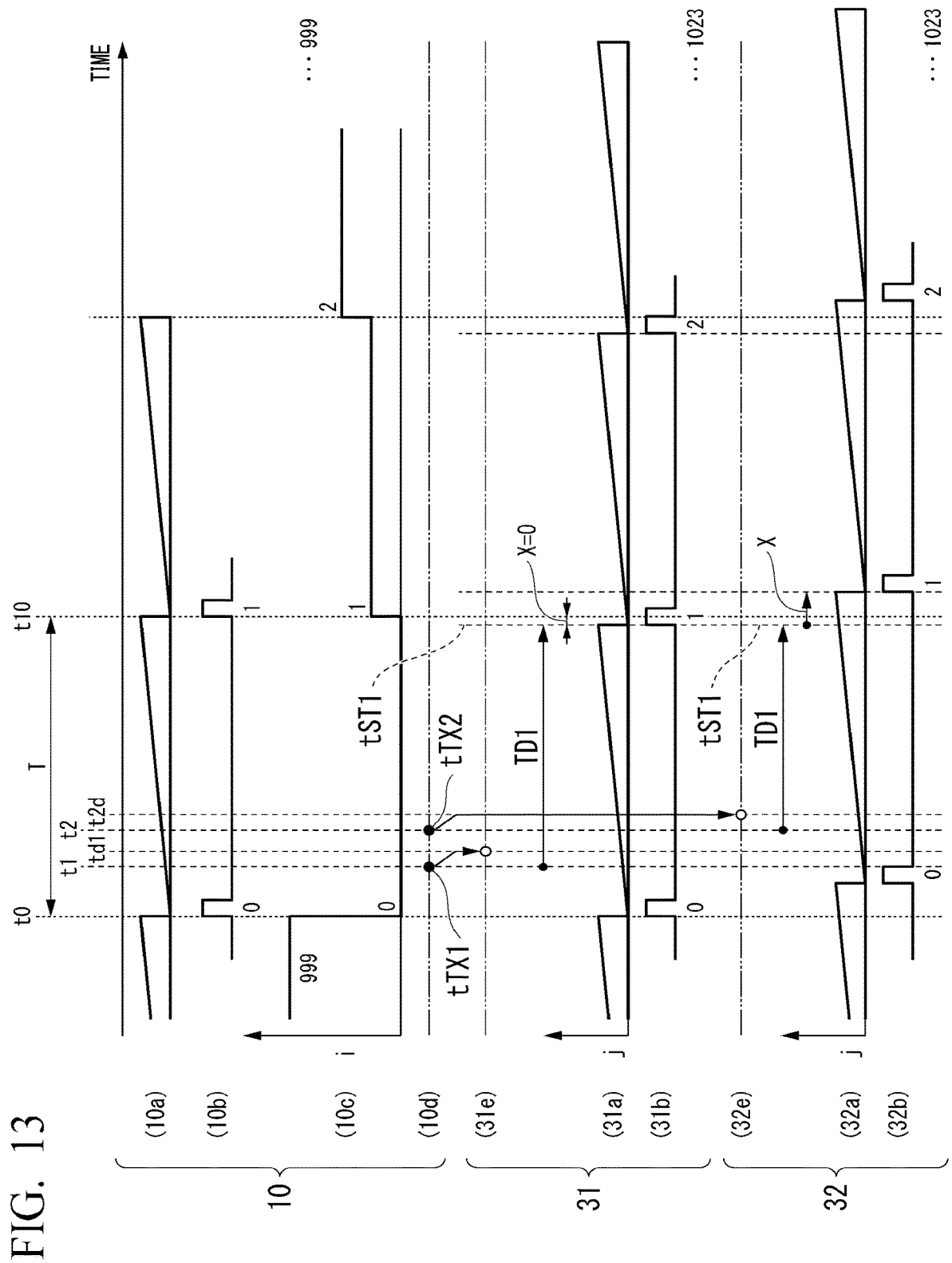
FIG. 13 is a diagram illustrating adjustment of a phase of a control period which is performed by the drive devices according to the second embodiment.

FIG. 13 is a diagram illustrating adjustment of the phase of the control period which is performed by the drive devices 30 according to the second embodiment. Waveforms illustrated in FIG. 13 are enlargement of parts corresponding to Range A in FIG. 7.

In the timing chart illustrated in FIG. 13, the triangular waves and the rectangular waves in FIG. 7 are illustrated, and a packet transmission timing (10d) and packet transmission timings (31e) and (32e) are added thereto. The waveform indicated by (10c) in FIG. 13 represents the value corresponding to the triangular wave (10c) in FIG. 7 (the identification information i) using a waveform changing in a stepped shape. The time axis in the timing chart illustrated in FIG. 13 is enlargement of a part of the time axis in the timing chart illustrated in FIG. 7. The period from time t0 to time t10 is the first period of the master device 10A.

In the master device 10A, at time t0, counting of the counter 13 is started from 0, and the count value thereof increases sequentially. The amplitude of the triangular wave (10*a*) indicates the count value. At time t0, a pulse of the rectangular wave (10*b*) is generated.

Similarly, in the first drive device 31A, at time t0, counting of the first counter 31232 is started from 0, and the count value thereof increases sequentially. The amplitude of the triangular wave (31*a*) indicates the count value. Similarly, at time t0, a pulse of the rectangular wave (31*b*) is generated. Since the pulse of the rectangular wave (31*b*) is generated, the first interruption signal generating unit 3122 generates an interruption signal and thus the first controller 312 of the first drive device 31A starts a first control process based on an interruption process.

The controller body 16 of the master device 10A determines the timing at which each packet is individually transmitted to the corresponding drive device 30A by adding the value of the time difference data in the transmission time data table (FIG. 11) to time t0. The master device 10A acquires time t1, for example, by adding Δt1 to time t0 for the first drive device 31A, and acquires time t2, for example, by adding Δt2 to time t0 for the second drive device 32A.

When the result of counting of the timer 12 becomes time t1, the master device 10A transmits a first packet of a first transmission synchronization signal to the first drive device 31A. At this time, the first communication processing unit 313A of the master device 10A transmits the first packet after time information tTX1 associated with time t1 at which the first transmission synchronization signal has been transmitted to the first packet.

Thereafter, at time t1*d*, the first drive device 31A receives the first transmission synchronization signal.

Thereafter, when the result of counting of the timer 12 becomes time t2, the master device 10A transmits a second packet of a second transmission synchronization signal to the second drive device 32A. At this time, the second communication processing unit 323A of the master device 10A transmits the second packet after adding time information tTX2 associated with time t2 at which the second transmission synchronization signal has been transmitted to the second packet.

Thereafter, at time t2*d*, the second drive device 32A receives the second transmission synchronization signal.

When the first communication processing unit 313A of the first drive device 31A receives the first transmission synchronization signal, the first communication processing unit 313A extracts time information tTX1 associated with time t1 at which the master device 10A has transmitted from the received first transmission synchronization signal and adds the value of the delay time TD1 to tTX1. For example, the first communication processing unit 313A uses the value of the delay time TD1 stored in the delay time storage unit 3134 as the correction calculating data table. The first communication processing unit 313A adds the result of calculation tST1 as data of the item of the designated time in the correction calculating data table. The first controller 312A uses the result of calculation tST1 as a designated value of the time at which phase comparison is performed.

When the second communication processing unit 323A of the second drive device 32A receives the second transmission synchronization signal, the second communication processing unit 323A extracts time information tTX2 associated with time t2 at which the master device 10A has transmitted from the received second transmission synchronization signal and adds the value of the delay time TD2 to tTX2. For example, the second communication processing unit 323A uses the value of the delay time TD2 stored in the delay time storage unit 3234 as the correction calculating data table. The second communication processing unit 323A adds the result of calculation tST2 as data of the item of the designated time in the correction calculating data table. The second controller 322A uses the result of calculation tST2 as a designated value of the time at which phase comparison is performed.

As described above, the first drive device 31A uses the time information tTX1 associated with time t1 at which the master device 10A has transmitted, not the time at which the first communication processing unit 313A has received the first transmission synchronization signal. Even when the there is a delay time between when the master device 10A has transmitted the first transmission synchronization signal and when the first drive device 31A has received the first transmission synchronization signal or even when the delay time fluctuates, the time (tST1) designated by the master device 10A can be reproduced without being affected thereby. The same is true of the second drive device 32A.

Accordingly, the first drive device 31A sets the timing at which phase comparison is performed to the time (tST1) designated by the master device 10A, and the second drive device 32A sets the timing at which phase comparison is performed to the time tST2 designated by the master device 10A. Each drive device 30A can compare the current phase with the reference phase at the designated timing of the time point. Since the times are designated to be substantially common timings, each drive device 30A can compare the phases at the common timing.

According to the above embodiment, the drive system 1A includes the first drive device 31A, the second drive device 32A, and the master device 10A. The master device 10A transmits identification information of each first period, a first transmission synchronization signal, and a second transmission synchronization signal for each first period of the reference period. The first controller 312A of the first drive device 31A adjusts a phase of each first control period such that the first control period is synchronized with a timing associated with a specific first synchronization signal out of a plurality of first synchronization signals which are acquired by reception of the first transmission synchronization signal a plurality of times using the identification information. In addition, the first controller 312A controls the first power converter 311 using the first control period. The second controller 322A of the second drive device 32A adjusts a phase of each second control period such that the second control period is synchronized with a timing associated with a specific second synchronization signal out of a plurality of second synchronization signals which are acquired by one of reception of the first transmission synchronization signal a plurality of times and reception of the second transmission synchronization signal a plurality of times using the identification information. In addition, the second controller 322A controls the second power converter 321 using the second control period. Accordingly, the drive system 1A can further enhance an alignment property of a plurality of electric motors 20.

When the identification information of the first period, the first transmission synchronization signal, and the second transmission synchronization signal are transmitted, the master device 10A may generate the first transmission synchronization signal and the second transmission synchronization signal for each first period in the reference period, supply the first transmission synchronization signal and the identification information i for identifying each first period in the reference period to the first drive device 31A for each first period in the reference period, and supply the second transmission synchronization signal and the identification information i to the second drive device 32A similarly thereto.

By determining a first reference timing associated with the time at which the specific first transmission synchronization signal has been generated in the reference period out of the plurality of first synchronization signals which are acquired by a plurality of receptions of the first transmission synchronization signal using the identification information i, the first controller 312A of the first drive device 31A may adjust the phase of the first control period such that the first control period is synchronized with the specific first synchronization signal corresponding to the first reference timing and control the first power converter using the first control period.

By determining a second reference timing associated with a time at which the specific second transmission synchronization signal has been generated in the reference period out of a plurality of second synchronization signals which are acquired by a plurality of receptions of the second transmission synchronization signal using the identification information, the second controller 322A of the second drive device 32A may adjust the phase of the second control period such that the second control period is synchronized with the specific second synchronization signal corresponding to the second reference timing and control the second power converter using the second control period. Accordingly, the drive system 1A can further enhance an alignment property of at least the first electric motor 21 and the second electric motor 22.

The master device 10A may supply the first transmission synchronization signal having the identification information i added thereto to the first drive device 31 and supply the second transmission synchronization signal having the identification information i added thereto to the second drive device 32. The first controller 312A may adjust the phase of the first control period to be synchronized with the specific first synchronization signal corresponding to the specific first transmission synchronization signal supplied at the first reference timing when the value of the identification information i added to the first transmission synchronization signal is a value of a constant C (constant value). The second controller 322A may adjust the phase of the second control period to be synchronized with the specific second synchronization signal corresponding to the specific second transmission synchronization signal transmitted at the second reference timing when the value of the identification information i added to the second transmission synchronization signal is the value of the constant C.

Depending on specifications of the network NW which is used, specifications of the protocol which is used for communication, or specifications of a relay device, the master device 10 may transmit the first transmission synchronization signal and the second transmission synchronization signal at different timings. The drive system 1 can also be applied to a configuration in which it is necessary to transmit the first transmission synchronization signal and the second transmission synchronization signal at different timings as described above.

The first controller 312A may adjust the phase of the first control period to be synchronized with the specific first synchronization signal at a first adjustment timing which is delayed by a first time from the first reference timing. The second controller 322A may adjust the phase of the second control period to be synchronized with the specific second synchronization signal at a second adjustment timing which is delayed by a second time from the second reference timing. Accordingly, after the master device 10A has transmitted the first transmission synchronization signal at the first reference timing, the first controller 312A can reproduce the first adjustment timing which is delayed by the first time from the first reference timing. After the master device 10A has transmitted the second transmission synchronization signal at the second reference timing, the second controller 322A can reproduce the second adjustment timing which is delayed by the second time from the second reference timing.

The master device 10A may transmit the first transmission synchronization signal and the second transmission synchronization signal at different timings. At this time, when the difference between the first reference timing and the second reference timing is determined in advance, it is possible to align the first adjustment timing and the second adjustment timing by applying the difference to the first time and the second time such that the difference between the first reference timing and the second reference timing is cancelled out.

For example, the first controller 312A may determine the first adjustment timing on the basis of a first reference time which has been transmitted from the master device 10A as the time at which the specific first transmission synchronization signal has been generated. The second controller 322A may determine the second adjustment timing on the basis of a second reference time which has been transmitted from the master device 10A as the time at which the specific second transmission synchronization signal has been transmitted. For example, when the first reference time and the second reference time which are transmitted from the master device 10A are information corresponding to packet transmission times, it is possible to reduce an influence of variation due to a transmission waiting time until a packet is transmitted from the master device 10.

MODIFIED EXAMPLE

Drive systems according to modified examples which are common to the first and second embodiments will be described below with reference to FIGS. 14A to 14C. These modified examples are different from the first and second embodiments in network configuration.

Figure 14A:
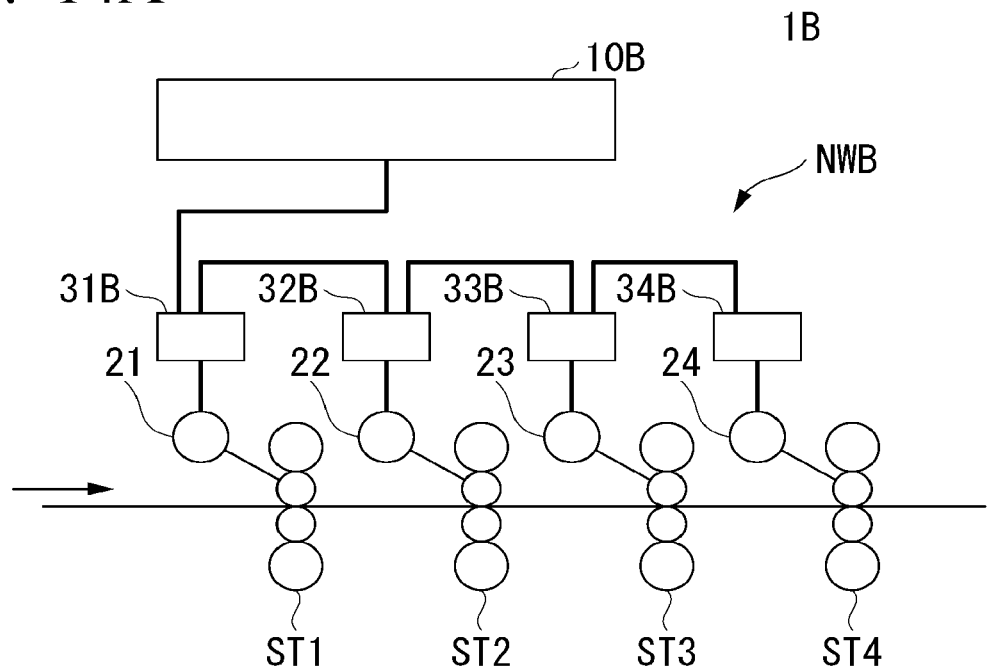
FIG. 14A is a diagram illustrating a configuration of a drive system according to a first modified example.

FIG. 14A is a diagram illustrating a configuration of a drive system 1B according to a first modified example.

The drive system 1B illustrated in FIG. 14A uses a cascade connection type network NWB. For example, the drive system 1B includes a master device 10B and first to fourth drive devices 31B to 34B which are connected in a cascade type from the master device 10 as a starting point. The master device 10B and the first to fourth drive devices 31B to 34B correspond to the master device 10 and the first to fourth drive devices 31 to 34 which are described above.

For example, when the master device 10B transmits packet to the network NWB to communicate with one of the first to fourth drive devices 31B to 34B, the first drive device 31B receives the packet and relays the received packet to the second drive device 32B in the subsequent stage. When it is detected that the packet is a packet transmitted to the first drive device, the first drive device 31B performs a process associated with the packet. The second drive device 32B and the third drive device 33B relay the packet similarly to the second drive device 32B, and the fourth drive device 34B is a termination of the network NWB and thus may not relay the packet. When it is detected that the packet is a packet transmitted to the second to fourth drive devices, the second to fourth drive devices 32B to 34B perform a process associated with the packet.

For example, when each of the first to fourth drive devices 31B to 34B transmits information to the master device 10, the information can be transmitted in response to a request from the master device 10. The method of causing each of the first to fourth drive devices 31B to 34B to transmit information to the master device 10 may be applied to network configurations which will be described later.

Figure 14B:
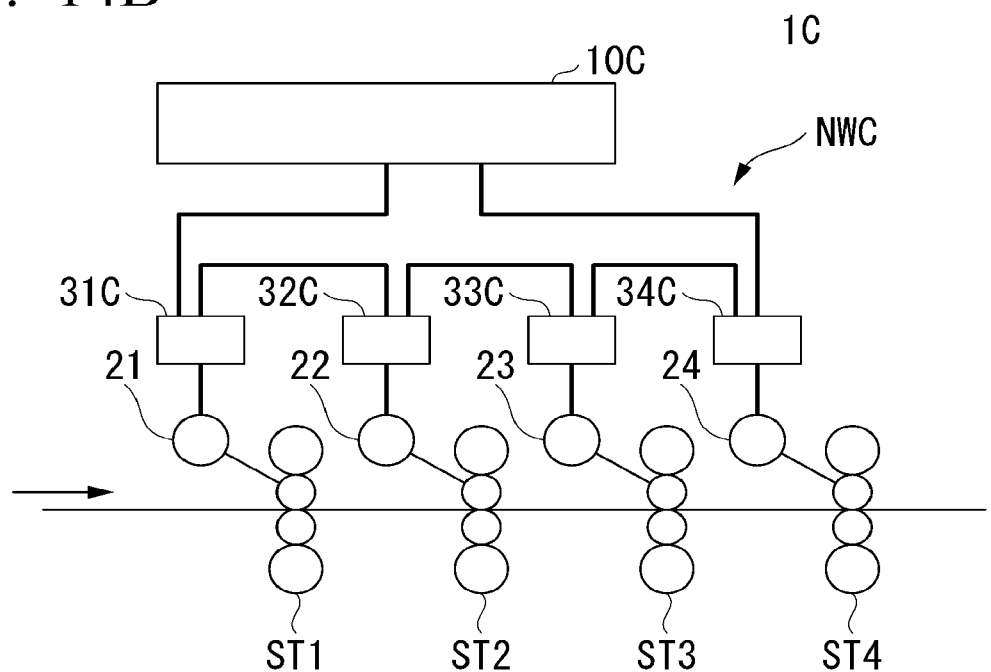
FIG. 14B is a diagram illustrating a configuration of a drive system according to a second modified example.

FIG. 14B is a diagram illustrating a configuration of a drive system 1C according to a second modified example.

The drive system 1C illustrated in FIG. 14B uses a ring connection type network NWC. For example, the drive system 1C includes a master device 10C including a first communication port and a second communication port and further includes first to fourth drive devices 31C to 34C. The first to fourth drive devices 31C to 34C are sequentially arranged in a ring of the network NWC with the first communication port of the master device 10C as a starting point and with the second communication port as an ending point.

Figure 14C:
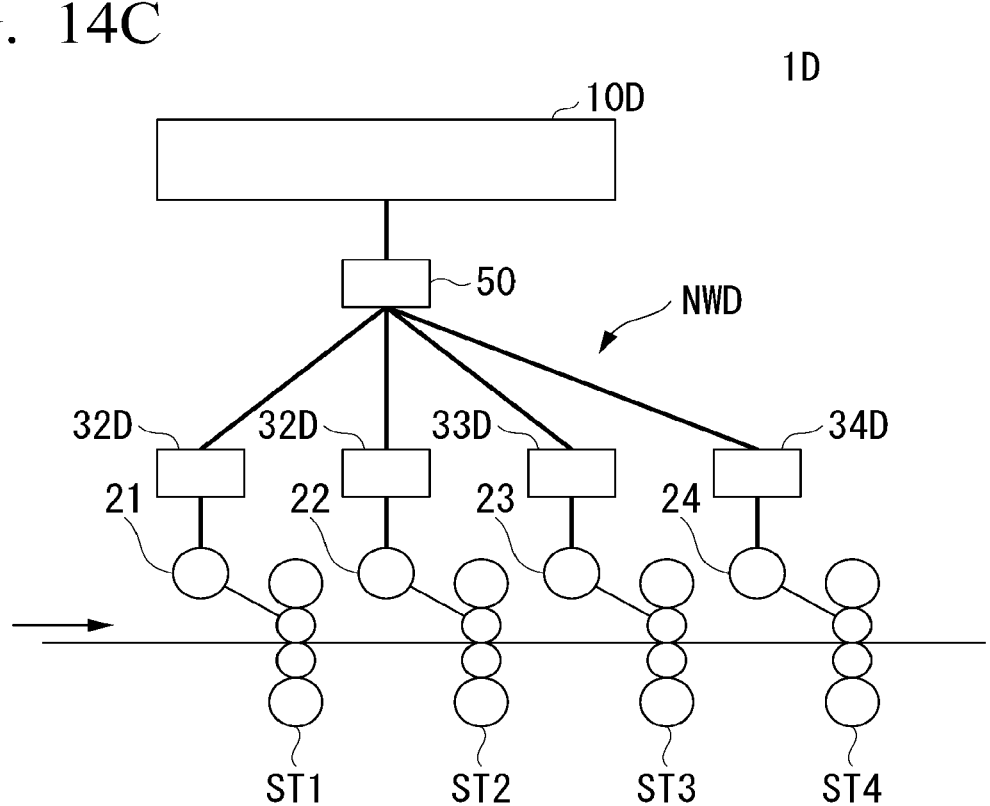
FIG. 14C is a diagram illustrating a configuration of a drive system according to a third modified example.

FIG. 14C is a diagram illustrating a configuration of a drive system 1D according to a third modified example.

The drive system 1D illustrated in FIG. 14C uses a single-star connection type network NWD. The network NWD includes a hub (HUB) 40 which is provided at a position of a single-star connection type node. A master device 10D and first to fourth drive devices 31D to 34D correspond to the master device 10 and the first to fourth drive devices 31 to 34 which are described above, respectively. For example, the master device 10 and the first to fourth drive devices 31D to 34D in the drive system 1D are connected to the hub 50. The master device 10 communicates with the first to fourth drive devices 31D to 34D via the hub 50. The hub 50 may be a switch or repeater that electrically relays a packet or may be an optical coupler in optical communication.

In the drive system 1A and the drive system 1B, a delay time may be caused due to a relay process when the drive devices relay a packet. The drive system 1A and the drive system 1B can secure an alignment property without being affected by variation in the delay time due to the relay process by employing the communication method described in the above embodiments. In the drive system 1D, a delay time may be caused when the hub 50 relays a packet, but it is similarly possible to secure an alignment property without being affected by variation in the delay time.

According to at least one embodiment described above, the drive system includes a first drive device, a second drive device, and a master device. The first drive device includes a first power converter 311 that supplies first electric power to a winding of a first electric motor 21 and a first controller that controls the first power converter 311. The second drive device includes a second power converter 321 that supplies second electric power to a winding of a second electric motor 22 and a second controller that controls the second power converter 321. The master device controls the first controller and the second controller using a first period and a reference period including a plurality of the first periods. The master device transmits identification information of each first period and a first transmission synchronization signal for each first period of the reference period or transmits identification information of each first period, a first transmission synchronization signal, and a second transmission synchronization signal for each first period of the reference period. The first controller adjusts a phase of each first control period such that the first control period is synchronized with a timing associated with a specific first synchronization signal out of a plurality of first synchronization signals which are acquired by reception of the first transmission synchronization signal a plurality of times using the identification information and controls the first power converter 311 using the first control period. The second controller adjusts a phase of each second control period such that the second control period is synchronized with a timing associated with a specific second synchronization signal out of a plurality of second synchronization signals which are acquired by one of reception of the first transmission synchronization signal a plurality of times and reception of the second transmission synchronization signal a plurality of times using the identification information and controls the second power converter 321 using the second control period. Accordingly, the drive system can further enhance an alignment property of a plurality of electric motors.

While some embodiments have been described above, the configurations of the embodiments are not limited to the embodiments. For example, the configurations of the embodiments may be embodied in combination with each other.

While some embodiments of the invention have been described above, the embodiments are presented as an example and are not intended to limit the scope of the invention. These embodiments can be modified in various forms and can be subjected to various omissions, substitutions, and changes without departing from the gist of the invention. The embodiments or modifications thereof belong to the inventions described in the appended claims and the scope equivalent thereto without departing from the scope or gist of the invention.

REFERENCE SIGNS LIST

1 Drive system
20 Electric motor
21 First electric motor
22 Second electric motor
30 Drive device
31, 31A, 31B, 31C, 31D First drive device
32, 32A, 32B, 32C, 32D Second drive device
10, 10A, 10B, 10C, 10D Master device
311 First power converter
321 Second power converter
312 First controller
322 Second controller
313 First communication processing unit
323 Second communication processing unit
3121 First controller body
3122 First interruption signal generating unit
31232 First counter
31233 First phase comparator
3221 Second controller body
3222 Second interruption signal generating unit
32232 Second counter
32233 Second phase comparator

The invention claimed is:
1. A drive system comprising:
a first drive device including a first power converter that supplies first electric power to a winding of a first electric motor and a first controller that controls the first power converter;
a second drive device including a second power converter that supplies second electric power to a winding of a second electric motor and a second controller that controls the second power converter; and a master device controlling the first controller and the second controller using a first period and a reference period including a plurality of the first periods, wherein the master device transmits identification information of each first period and a first transmission synchronization signal for each first period of the reference period or transmits identification information of each first period, a first transmission synchronization signal, and a second transmission synchronization signal for each first period of the reference period, wherein the first controller adjusts a phase of each first control period such that the first control period is synchronized with a timing associated with a specific first synchronization signal out of a plurality of first synchronization signals which are acquired by reception of the first transmission synchronization signal a plurality of times using the identification information and controls the first power converter using the first control period, and wherein the second controller adjusts a phase of each second control period such that the second control period is synchronized with a timing associated with a specific second synchronization signal out of a plurality of second synchronization signals which are acquired by one of reception of the first transmission synchronization signal a plurality of times and reception of the second transmission synchronization signal a plurality of times using the identification information and controls the second power converter using the second control period.

2. The drive system according to claim 1, wherein the first controller performs control such that the first synchronization signals not corresponding to the specific first synchronization signal out of the plurality of first synchronization signals are excluded from signals to be controlled at the time of synchronization of the first control period, and wherein the second controller performs control such that the second synchronization signals not corresponding to the specific second synchronization signal out of the plurality of second synchronization signals are excluded from signals to be controlled at the time of synchronization of the second control period.

3. The drive system according to claim 1, wherein a reference length of the first period and a reference length of the first control period are different from each other.

4. The drive system according to claim 1, wherein the master device transmits the first transmission synchronization signal and identification information for identifying each first period in the reference period to the first drive device for each first period in the reference period and transmits the second transmission synchronization signal and the identification information to the second drive device for each first period in the reference period, wherein the first controller determines a first reference timing associated with a time at which the specific first transmission synchronization signal has been generated in the reference period out of a plurality of first synchronization signals which are acquired by a plurality of receptions of the first transmission synchronization signal using the identification information and adjusts the phase of the first control period such that the first control period is synchronized with the specific first synchronization signal corresponding to the first reference timing, and wherein the second controller determines a second reference timing associated with a time at which the specific second transmission synchronization signal has been generated in the reference period out of a plurality of second synchronization signals which are acquired by a plurality of receptions of the second transmission synchronization signal using the identification information and adjusts the phase of the second control period such that the second control period is synchronized with the specific second synchronization signal corresponding to the second reference timing.

5. The drive system according to claim 4, wherein the master device transmits the first transmission synchronization signal having the identification information added thereto to the first drive device and transmits the second transmission synchronization signal having the identification information added thereto to the second drive device, wherein the first controller adjusts the phase of the first control period to be synchronized with the specific first synchronization signal corresponding to the specific first transmission synchronization signal transmitted at the first reference timing when a value of the identification information added to the first transmission synchronization signal is a predetermined constant value, and wherein the second controller adjusts the phase of the second control period to be synchronized with the specific second synchronization signal corresponding to the specific second transmission synchronization signal transmitted at the second reference timing when a value of the identification information added to the second transmission synchronization signal is a predetermined constant value.

6. The drive system according to claim 4, wherein the first controller adjusts the phase of the first control period to be synchronized with the specific first synchronization signal at a first adjustment timing which is delayed by a first time from the first reference timing, and wherein the second controller adjusts the phase of the second control period to be synchronized with the specific second synchronization signal at a second adjustment timing which is delayed by a second time from the second reference timing.

7. The drive system according to claim 6, wherein the first controller determines the first adjustment timing on the basis of a first reference time which is transmitted from the master device and which indicates a time at which the specific first transmission synchronization signal has been transmitted, and wherein the second controller determines the second adjustment timing on the basis of a second reference time which is transmitted from the master device and which indicates a time at which the specific second transmission synchronization signal has been transmitted.

8. The drive system according to claim 1, wherein the master device transmits the first transmission synchronization signal and the second transmission synchronization signal at different timings.

9. The drive system according to claim 1, wherein the master device transmits the first synchronization signal and the second synchronization signal in the first period.

10. The drive system according to claim 1, wherein the first period of the master device is 1/M of the reference period, wherein the first control period of the first controller is 1/N of the reference period, wherein the second control period of the second controller is 1/N of the reference period, and wherein the value of M and the value of N are different from each other.

11. The drive system according to claim 4, wherein the first drive device includes a first communication processing unit configured to output the identification information added to the first transmission synchronization signal and the specific first synchronization signal corresponding to the first transmission synchronization signal, and wherein the first controller includes:
a first counter configured to generate a first clock signal by dividing a frequency of a first reference clock, to generate a count value of a first count of a result of counting the number of waves of the first clock signal, to correct the count value of the first count on the basis of conditions of a time point of the first reference timing, and to generate a second clock with the first control period using one of the count value of the first count and the corrected count value of the first count;

a first phase comparator configured to perform comparison of a phase difference between a reference of the phase of the first control period and a reference of the phase of the specific first synchronization signal using the count value of the first count and to generate a correction value for correcting the count value of the first count at the time point of the first reference timing;

a first interruption signal generating unit configured to generate a first interruption signal with the first control period on the basis of the second clock; and a first controller body configured to start a first process of controlling the first power converter using the first clock signal on the basis of the first interruption signal.

12. The drive system according to claim 11, wherein the first phase comparator generates the correction value for correcting the count value of the first count such that the difference between the reference of the phase of the first control period and the reference of the phase of the specific first synchronization signal decreases on the basis of the result of comparison.

13. The drive system according to claim 11, wherein the second drive device includes a second communication processing unit configured to output the identification information added to the second transmission synchronization signal and the specific second synchronization signal corresponding to the second transmission synchronization signal, and wherein the second controller includes:
a second counter configured to generate a third clock signal by dividing a frequency of a second reference clock, to generate a count value of a third count of a result of counting the number of waves of the third clock signal, to correct the count value of the third count on the basis of conditions of a time point of the second reference timing, and to generate a fourth clock with the second control period using one of the count value of the third count and the corrected count value of the third count;

a second phase comparator configured to perform comparison of a phase difference between a reference of the phase of the second control period and a reference of the phase of the specific second synchronization signal using the count value of the third count and to generate a correction value for correcting the count value of the third count at the time point of the second reference timing;

a second interruption signal generating unit configured to generate a second interruption signal with the second control period on the basis of the fourth clock; and a second controller body configured to start a second process of controlling the second power converter using the third clock signal on the basis of the second interruption signal.

14. The drive system according to claim 13, wherein the second phase comparator generates the correction value for correcting the count value of the third count such that the difference between the reference of the phase of the second control period and the reference of the phase of the specific second synchronization signal decreases on the basis of the result of comparison.

15. The drive system according to claim 1, wherein the first controller controls the first power converter by performing a first interruption process using a first interruption signal with the first control period, and wherein the second controller controls the second power converter by performing a second interruption process using a second interruption signal with the second control period.

16. A drive system comprising:
a first drive device that drives a first electric motor according to control and uses power of the first electric motor to convey an object;

a second drive device that drives a second electric motor according to control and uses power of the second electric motor to convey the object; and a master device that controls the first drive device and the second drive device using a first period and a reference period including a plurality of the first periods, wherein the master device outputs a first transmission synchronization signal that enables identification of each first period in the reference period for each first period, wherein the first drive device receives the first transmission synchronization signal a plurality of times, selects a specific first synchronization signal corresponding to a first reference timing in the reference period out of a plurality of first synchronization signals which are acquired by a plurality of receptions of the first transmission synchronization signal, and adjusts a first control timing at which a process associated with control of the first electric motor is to be started using the specific first synchronization signal, and wherein the second drive device receives the first transmission synchronization signal a plurality of times, selects a specific second synchronization signal corresponding to the first reference timing out of a plurality of second synchronization signals which are acquired by a plurality of receptions of the first transmission synchronization signal, and adjusts a second control timing at which a process associated with control of the second electric motor is to be started using the specific second synchronization signal.

* * * * *